United States Patent
Lafuente

(10) Patent No.: US 9,253,639 B1
(45) Date of Patent: Feb. 2, 2016

(54) METHODS AND SYSTEMS TO ENABLE PRESENCE RELATED SERVICES

(71) Applicant: Afirma Consulting & Technologies, S.L., Madrid (ES)

(72) Inventor: Carlos Alberto Pérez Lafuente, Madrid (ES)

(73) Assignee: AFIRMA CONSULTING & TECHNOLOGIES, S.L., Madrid (ES)

( * ) Notice: Subject to any disclaimer, the term of this patent is extended or adjusted under 35 U.S.C. 154(b) by 0 days.

(21) Appl. No.: 14/456,789

(22) Filed: Aug. 11, 2014

(51) Int. Cl.
    *H04W 12/06* (2009.01)
    *H04W 4/02* (2009.01)
    *H04L 29/06* (2006.01)

(52) U.S. Cl.
    CPC ........... *H04W 12/06* (2013.01); *H04L 63/0838* (2013.01); *H04W 4/021* (2013.01)

(58) Field of Classification Search
    CPC . H04L 63/0838; H04L 9/3228; H04L 63/083; H04L 9/0863; H04L 63/067; H04W 12/06; G06F 21/31
    See application file for complete search history.

(56) References Cited

U.S. PATENT DOCUMENTS

| | | | |
|---|---|---|---|
| 6,334,052 B1 | 12/2001 | Nordstrand | |
| 6,516,190 B1 | 2/2003 | Linkola | |
| 6,516,193 B1 | 2/2003 | Salmela et al. | |
| 6,671,506 B1 | 12/2003 | Lee | |
| 6,785,536 B1 | 8/2004 | Lee et al. | |
| 6,826,414 B1 | 11/2004 | Reynolds et al. | |
| 6,920,317 B1 | 7/2005 | Muhonen | |
| 8,423,768 B2 * | 4/2013 | Huang et al. | 713/168 |
| 8,557,392 B2 | 10/2013 | Fujisawa et al. | |
| 8,630,741 B1 | 1/2014 | Matsuoka et al. | |
| 8,677,377 B2 | 3/2014 | Cheyer et al. | |
| 8,723,664 B2 | 5/2014 | Rezvani et al. | |
| 2002/0094801 A1 | 7/2002 | Atorf | |
| 2011/0162048 A1 | 6/2011 | Bilbrey et al. | |
| 2014/0019367 A1 | 1/2014 | KHAN et al. | |
| 2014/0059347 A1 | 2/2014 | Dougherty et al. | |
| 2014/0187200 A1 | 7/2014 | Reitter et al. | |

FOREIGN PATENT DOCUMENTS

WO   01/03372   1/2001

OTHER PUBLICATIONS

Bao, Lichun, "Location Authentication Methods for Wireless Network Access Control," Performance, Computing and Communications Conference, 2008, pp. 160-167.
International Search Report and Written Opinion, mailed in PCT Application No. PCT/IB2015/056109 on Nov. 9, 2015.

* cited by examiner

*Primary Examiner* — Curtis Odom
(74) *Attorney, Agent, or Firm* — Davis Wright Tremaine LLP; Heather M. Colburn

(57) ABSTRACT

Methods and apparatus for monitoring the presence of a mobile device in at least one special area, wherein a radio communication defining device transmits a radio distinctive defining signal that defines the special area by its coverage. The mobile device processes signals received to determine whether or not the signals are a distinctive defining signal that at least partially defines the special area. Upon a determination that the mobile device is in a special area the mobile device sends an updating signal to a special operating means of a provider of presence related services via a mobile telephone network, the special operating means adapts the value of one or more operating parameter in response to receiving the updating signal. The mobile device also generates a One-Time-Password (OTP) calculated based on information in the distinctive defining signal and sends the OTP to a server of the provider of presence related services.

43 Claims, 12 Drawing Sheets

METHODS AND SYSTEMS TO ENABLE PRESENCE RELATED SERVICES

TECHNICAL FIELD

The invention relates to methods and apparatus to enable presence related services.

BACKGROUND

Microprocessor smart cards have been commonly used to protect keys and secret data of given applications from service providers. Being considered as a "anti-tamper" device, the smart cards have been used to protect payment applications from banks, ticketing applications from transportation authorities or personal data for access control purposes.

Nevertheless, the history of the microprocessor smart cards also teach about the difficulties of service providers and secure element owners to reach agreements to exploit a service in cooperation. In particular, and in spite of the huge potential of the secure elements in terms of secure storage capabilities, business model barriers and technical complexity have limited their possibilities to exploit in areas such as mobile contactless payments or mobile ticketing.

In the coming Internet of Things (IoT) ecosystem a multiplicity of service providers will deploy new services related to the billions or even trillions of devices that belongs to end users, enterprises, service providers or to other entities. In such a context it is essential to set the grounds to avoid the success of certain IoT applications (e.g. those managing very sensitive assets and/or handling critical authentication processes to access to services providers services) into mobile devices depending on the above referred agreements between the service providers and the secure elements owners.

In such a context it would be desirable to develop mobile device applications that would be tamper-resistant even if not partly stored in a tamper-resistant device such as a SIM card or a micro-SD card (owned by a party that is typically different than the service provider).

Most of the applications (related to messaging, productivity, entertainment, music, health, social networks, news, sports, etc.) that a user may download from an application market (such an iTunes, Google Play or Blackberry World) cannot claim to be tamper-resistant, but it is maybe due to the fact that the assets they protect are considered as not being "so critical".

It is nevertheless well understood that mobile payment applications or other type of applications giving access to services from services providers need to be tamper-resistant protected. In particular, in the context of this invention, it is considered that a mobile device application providing access to presence related services need to be anti-tamper, and this invention provides methods to achieve that target even if not using, for example, a microprocessor smart card to either perform part of the mobile device application processing or to store sensitive data of the service providers' mobile device applications.

SUMMARY OF THE DISCLOSURE

What is disclosed herein are new methods and apparatus for secure authentication of mobile device applications in an IoT ecosystem. The methods and apparatus relate to the enabling and/or disabling of presence related services which is further discussed in U.S. Pat. No. 8,738,040, issued on May 27, 2014, entitled, "Method and system for monitoring a mobile station presence in a special area", which is incorporated by reference herein in its entirety.

According to some implementations a mobile device application in a mobile device is personalized such that the mobile device is able to self-determine its presence status in at least one special area associated to the mobile device, each special area being defined by the combination of distinctive wireless signals from one or more radio communication devices; and the mobile device sends an updating signal about its presence in one or more special areas to the mobile telephone network, the signal being routed to special operating means of a service provider entity, that enable or disable presence related services depending on whether the updating signal indicates that the mobile device is present or not into one or more special areas. Presence updating signals may be used to enable or disable presence related services, and in certain contexts it is desirable to provide mechanisms to securely authenticate at least part of the presence updating signals.

According to some implementations client-server-based one-time-use calculations are used to securely authenticate presence updating signals. According to some implementations the one-time-use calculations depend on input data associated to radio communication devices, but only those radio communication devices associated to special areas personalized into the mobile device application may produce a successful authentication in the referred special operating means of the service provider. So on top of having the right mobile device and mobile device application personalization, the user must be in the right environment for an updating signal being accepted as authentic by the special operating means.

According to some implementations a Personal Identification Number (PIN) is required as input for the referred one-time-use calculations, thus in such implementations the authentication methods are defined such that it is necessary that the user will enter a personal secret code as a precondition for an updating signal being later securely authenticated.

According to some implementations pre-calculated tokens and/or hardcoded keys/parameters are used to make the one-time-use calculations that securely authenticate presence updating signals.

It must be considered that in some circumstances, or in the context of certain services, a fully automatic method for securely enabling/disabling presence related services by sending a presence updating signal and a one-time-use related calculation is desired; while in others it may be required that the user will insert a PIN to make presence related services being enabled or disabled by the special operating means of the service provider.

According to some implementations, the fully automatic methods may be used to make one-time-use calculations associated to N updating signals sent from the mobile device about its presence in one or more special areas, but a PIN may be required as an input for a one-time-use calculation correlated to sending the N+1 updating signal about the mobile device presence in the one or more special areas. In this way, two-factor authentication may be used in correlation with at least part of the updating signals sent, so the user identity is verified on a periodic basis.

According to some implementations service providers are provided with a method to securely enable (or disable) presence related services by using a mobile device application, where said method can be mostly performed at the domain of the services providers, without restrictions from third party owners of secure elements.

According to some implementations this is achieved by providing a method associated with one or more providers of presence related services in connection with the use of a mobile device and at least a first radio communication defining device that transmits a first distinctive defining signal and a second radio communication defining device that transmits a second distinctive defining signal, the first distinctive defining signal at least partly defines a first special area by its coverage, the second distinctive defining signal at least partly defining a second special area by its coverage. The method may include (i) electronically storing in one or more memories data capable of linking the mobile device to the first and second special areas, the data including a first checking data of the first radio communication defining device, a second checking data of the second radio communication defining device, and a first identifier related to the mobile device, (ii) transmitting via a mobile telephone network to the mobile device at least a portion of the first checking data, and transmitting via the mobile telephone network to the mobile device at least a portion of the second checking data, (iii) receiving from the mobile device via the mobile telephone network a first updating signal uncorrelated to any mobile device phone call establishment that identifies the mobile device's presence in at least the first special area, and receiving from the mobile device via the mobile telephone network a second updating signal uncorrelated to any mobile device phone call establishment that identifies the mobile device's presence in at least the second special area, the first updating signal including a second identifier related to the mobile device, the second updating signal including a third identifier related to the mobile device, (iv) deriving from the first updating signal by one or more processing devices having access to at least a portion of the data whether or not the mobile device is present in the first special area, and deriving from the second updating signal by the one or more processing devices whether or not the mobile device is present in the second special area; and (v) enabling or disabling by use of the one or more processing devices a presence related service based upon the mobile device's presence or non-presence in the first special area, and enabling or disabling by use of the one or more processing devices a presence related service based upon the mobile device's presence or non-presence in the second special area, wherein, when the first updating signal indicates that the mobile device is present in the first special area, enabling the presence related service associated to the mobile device's presence in the first special area also depends on a successful validation by use of the one or more processing devices of at least one One-Time-Password (OTP), the at least one OTP being sent from the mobile device and being univocally correlated to the first updating signal, where at least one OTP is calculated based on information that is included in at least one of the distinctive defining signals that define the first special area, and, when the second updating signal indicates that the mobile device is present in the second special area, enabling the presence related service associated to the mobile device's presence in the second special area also depends on a successful validation by use of the one or more processing devices of at least one One-Time-Password (OTP), the at least one OTP being sent from the mobile device and being is univocally correlated to the second updating signal.

Advantageously, access to presence driven services relates to presence of the mobile device into one or more special areas but, on top of that, additional OTP-based authentication may be performed by the one or more processing devices. Furthermore, at least one of the OTP calculations is performed when the mobile device is present into the first special area, based on information that is included in at least one of the distinctive defining signals that define the first special area.

It must be noted that if the mobile device determines that it is not present in a given special area, then distinctive defining signals related to that special area are probably not being received by the mobile device at that time. It means that an OTP calculation correlated to an updating signal about the mobile device not being present into the special area should not be based on distinctive defining signals for that special area (that probably are not being received at that time), but on other input data. According to some implementations methods for calculating OTP results in said non-presence scenario, such that adequate authentication techniques may be in place also in that context, are also provided.

If the information received by the mobile device from the radio communication defining devices makes the mobile device determining that it is present into the first special area, then at least a portion of the checking data received into the distinctive defining signals that define the first special area will produce a successful OTP validation by the one or more processing devices, when used as input data to calculate said OTP.

This approach can provide a fully automatic OTP calculation, associated to the first updating signal, empowered by information related to the context of the mobile device being into the first special area. More than one OTP may be sent univocally associated to the first updating signal, and said other OTPs may also be calculated using data from the context of the mobile device being into the first special area as input data and/or a user's Personal Identification Number (PIN).

According to some implementations at least one of the OTPs that are sent from the mobile device and that are univocally correlated to an updating signal is calculated by the mobile device by using a user's Personal Identification Number (PIN) as input data for the calculation.

According to some implementations at least one of the OTPs that are sent from the mobile device and that are univocally correlated to an updating signal is calculated by the mobile device based on information that is included in at least one of the distinctive defining signals that define the special area and also using a user's Personal Identification Number (PIN) as input data for the OTP calculation.

According to some implementations pre-calculated tokens and/or hardcoded keys/parameters may also be used as input data in any of the above referred OTP calculations.

According to some implementations, as a result of the mobile device being in at least one special area, the user is prompted to enter a PIN as an input for the OTP calculation. In other implementations the user is prompted to enter the PIN before the presence updating signal is sent to the service provider, via the mobile telephone network.

Also, in connection to the second updating signal, each OTP may be calculated by the mobile device based on information that is included in at least one of the distinctive defining signals that define the second special area and/or using a user's Personal Identification Number (PIN) as input data for the OTP calculation and/or using hardcoded keys/parameters as input data for the OTP calculation and/or using pre-calculated tokens as input data for the OTP calculation.

Different alternatives are possible in connection to the calculation of the OTPs, and in relation to perform the above referred univocal correlation between an updating signal and an OTP. Some of these alternatives are explained in detail below.

According to some implementations an OTP is calculated when the mobile device enters into or exists out of a special area, and the OTP is sent comprised into the presence updating signal. In other implementations the OTP and the updating signal are sent in the context of the same https session, so they can be easily correlated.

According to some implementations the at least one OTP and the presence updating signal are sent via different channels (e.g. one is sent via an https data connection and the other one is sent via SMS) but both are transmitted with a common identifier, that can be used by the one or more processing devices to later match them.

According to some implementations a first OTP is calculated when the mobile device enters into one special area, but the updating signal will be sent later. According to some implementations the updating signal will comprise the referred first OTP (e.g. calculated based on information that is included in at least one of the distinctive defining signals that define the special area) and a second OTP (calculated at the time of sending the presence updating signal, for example, after the user inserts a PIN that is used as an input to calculate the second OTP). So in this example the one or more processing devices will be able to authenticate both the context of the presence determination into the special area (validating the first OTP) and the content of the presence updating defined by the user inserting a PIN (validating the second OTP).

According to some implementations a first OTP is calculated when the mobile device remains in a first special area, said first OTP being calculated based on checking data that is included in a received first distinctive defining signal that partly defines a first special area; the first OTP is sent comprised in a first updating signal; and a second OTP is calculated when the mobile device enters into a second special area, the second OTP calculation requiring the user to insert a PIN; the second OTP is sent comprised into a second updating signal.

According to some implementations, if the communication channel to send the presence updating signal is not available for the mobile device, the OTP is not calculated.

According to some implementations, the data stored in the one or more memories also includes the keys and parameters necessary to validate by the one or more processing devices the at least one OTP associated to a presence updating signal; and keys and parameters necessary for OTP calculations by the mobile device are transmitted via a mobile telephone network to the mobile device.

According to some implementations at least one OTP calculation is triggered by the mobile device being in the first special area, and at least part of the first checking data is inputted to the calculation from the storage/memory of the mobile device. According to some implementations at least one OTP calculation is triggered by the mobile device being in the first special area, and at least part of the checking data that at least partly defines the first special area is inputted to the calculation from the storage/memory of the mobile device (so in this implementation the OTP may be calculated based on information (e.g. checking data) included in the first distinctive defining signal and/or based on information (e.g. checking data that also at least partially defines the first special area) included in other distinctive defining signals that may also partly define the first special area. According to some implementations at least part of the first checking data is inputted in at least one OTP calculation after being received (and perhaps decoded) from at least one of the distinctive defining signals that at least partially define the first special area (in these implementations at least part of other checking data that also partly define the first special area may also be inputted into the at least one OTP calculation from the storage/memory of the mobile device).

According to some implementations the user is prompted to enter a PIN when the mobile device enters into/remains into/leaves out of an special area (such that a first OTP calculation is made), and to enter the PIN again before the presence updating signal is sent to the service provider system (and a second OTP calculation is made), the presence updating signal comprising the first and the second OTP results. So in this last example the one or more processing devices will be able to authenticate both the context of the presence determination and the context where the presence updating signal is sent. This may be of interest, for example, when the presence determination information is not sent at the time of determination, but with a delay. So the second OTP ensures that the updating signal sending has also been validated by the user after, for example, inserting a secret code.

According to some implementations part of the information that is included in at least one of the distinctive defining signals that define the special area is used as challenge for an OTP calculation, and the PIN inserted by the user is used as part of the OTP key.

According to some implementations, to make a first special area and/or second special area of one or more providers of presence related services becoming at least partly registered for a mobile device requires the user inserting an activation code into the mobile device and a successful validation of said activation code by the one or more processing devices.

According to some implementations there is a first set of checking data related to one or more radio communication defining devices, the first set of checking data defining (together with special area rules) one of more special areas related, for example, to home presence services; and a second set of checking data related to one or more other radio communication defining devices, the second set of checking data defining (together with special area rules) other one or more special areas related, for example, to smart city presence services. When the user inserts an activation code related to said home presence services special areas into the mobile device there is a secure registration process initiated from the mobile device, and if the activation code is successfully validated by the one or more processing devices then said one or more special areas for home presence services become preregistered for the mobile device. An equivalent process would be carried out in connection to the smart city activation code, such that if the activation code is successfully validated then the one or more special areas for smart city presence services become preregistered for the mobile device.

According to some implementations, to make a first special area and/or second special area of one or more providers of presence related services becoming at least partly registered into a mobile device requires the user inserting an activation code into the mobile device and a successful validation of said activation code by the one or more processing devices, and also requires the user to select or insert a Personal Identification Number (PIN) in the context of said registration process. So advantageously the PIN is securely stored in one or more memories of the service provider and the user can later use the PIN as an input for OTP calculations.

According to some implementations the data stored in the one or more memories related to the first special area is stored in a first memory or set of memories of a first provider of presence related services and the data stored in the one or more memories related to the second special area is stored in a second memory or set of memories of a second provider of presence related services.

According to some implementations the mobile telephone network transmits to the mobile device the at least portion of the first checking data and the at least portion of the second checking data at different times. In one example a first special area is defined by a service provider and the related checking data are transmitted to the mobile device; a second special area is defined later by the same service provider, and the checking data are afterwards transmitted to the same mobile device. In other examples several special areas are defined by different service providers, and the at least portion of the checking data related to the special areas of each service provider is transmitted to the mobile device independently of the transmission of the at least portion of the checking data related to the special areas of the other service providers.

According to some implementations the one or more processing devices has access to at least a portion of the data (such as, for example an identifier related to the mobile device) and updates at least one first operating parameter in a database of the one or more providers of presence related services depending on the presence of the mobile device in the first special area and/or second special area.

According to some implementations the one or more processing devices has access to at least a portion of the data (such as, for example an identifier related to the mobile device and the checking data) and updates at least one second operating parameter in a database of the one or more providers of presence related services depending on the result of the validation of the at least one OTP that is univocally correlated to the updating signal about the presence of the mobile device in the first special area and/or second special area.

As such, according to some implementations the updating of the at least two operating parameters depends on the result of a multi-level authentication, where the first level relates to the mobile device presence status in the special area, as provided by the updating signal, and the other levels relates to the validation result of the at least one OTP that is correlated to said presence updating signal.

According to some implementations the first operating parameter is a tariff flag or a service flag that enables or disables a special tariff or a service for the mobile device.

According to some implementations the one or more processing devices include a first processing device associated with a first provider of presence related services and a second processing device associated with a second provider of presence related services.

According to some implementations the first processing device has access to at least a portion of the data (such as, for example an identifier related to the mobile device) and updates at least one first operating parameter in a database of the first provider of presence related services depending on the presence of the mobile device in the first special area, and the second processing device has access to at least a portion of the data (such as, for example an identifier related to the mobile device) and updates at least one first operating parameter in a database of the second provider of presence related services depending on the presence of the mobile device in the second special area.

According to some implementations the first processing device has access to at least a portion of the data (such as, for example an identifier related to the mobile device and the first checking data) and updates at least one second operating parameter in a database of the first provider of presence related services depending on the result of the validation of the at least one OTP that is univocally correlated to the updating signal about the presence of the mobile device in the first special area, and the second processing device has access to at least a portion of the data (such as, for example an identifier related to the mobile device and the second checking data) and updates at least one second operating parameter in a database of the second provider of presence related services depending on the result of the validation of the at least one OTP that is univocally correlated to the updating signal about the presence of the mobile device in the second special area According to some implementations the updating of the at least one first operating parameter in a database of the first service provider depends on the presence of the mobile device in the first special area; and the updating of the at least one second operating parameter in a database of the first provider of presence related services depends on the result of the validation of a first OTP that has been calculated based on information that is included in at least one of the distinctive defining signals that define the first special area and on the result of the validation of a second OTP that has been calculated based on a PIN inserted by the user in the mobile device, both OTPs are univocally correlated to the first updating signal.

According to some implementations the first operating parameter is a tariff flag or a service flag that enables or disables a special tariff or a service for the mobile device.

According to some implementations the first, second and third identifiers related to the mobile device are the same.

According to some implementations the enabling or disabling of the first and/or second presence related service includes transmitting via the mobile telephone network a signal to the mobile device that is capable of being used to enable or disable one or more related functions in the mobile device. According to some implementations the signal enables, when the mobile device is present, for example, in a home special area, software in the mobile device that records statistic data about mobile device usage in said home special area (e.g. type of applications used, used connections, periods of activity, etc.). The same applies to other types of special areas, such as, for example, mobile device usage in a company special area.

According to some implementations the signal enables a mobile device payment capability when the mobile device is in a special area defined by, for example, certain NFC Point of Sale terminals at merchant locations; or into a special area defined by certain Bluetooth Low Energy devices. In another example the signal enables a mobile device ticketing capability (e.g. a mobile boarding card) when the mobile device is into a special area defined by certain BLE boarding-area-devices in an airport.

According to some implementations the one or more memories and the one or more processing devices reside in one or more servers of the one or more providers of presence related services.

According to some implementations the storing of the first and second checking data in the one or more memories comprises electronically receiving from the mobile device the first and second checking data.

According to some implementations the mobile telephone network is cellular.

According to some implementations at least one of the first and second updating signals comprises the result of a previous determination performed by the mobile device about the mobile device's presence in the first and second special areas, respectively.

According to some implementations data about wireless home appliances (e.g. maintenance information) is recorded at the mobile device, when the mobile device enters into the special area defined for each one of the appliances (e.g. a wireless TV, a wireless washing machine and a wireless iron). In this example, data about each electronic appliance is recorded at the mobile device, together with an OTP calculated using the corresponding home appliance checking data, but the mobile device only sends the information when a threshold in the amount of information to be sent has been exceeded or on a periodic basis (e.g. periods of 30 minutes) after entering in the first special area with data to be sent. In this case the presence status of the mobile device having entered into the different special areas, plus the associated information data, are comprised in a presence updating signal; the OTPs related to the presence of the mobile device into the special areas are also comprised into the updating signal. According to some implementations, when the conditions to send the updating signal are met, the user is prompted to insert a PIN, and a calculated OTP(PIN) is also send comprised into the updating signal.

According to some implementations at least one of the first and second updating signals is received via the mobile telephone network from the mobile device at least one of (i) periodically, (ii) at times recent to when the mobile device respectively enters into or exists from the first special area and/or second special area, (iii) when the mobile device respectively remains in the first special area and/or the second special area, and (iv) when the mobile device respectively remains outside the first special area and/or second special area.

According to some implementations at least one of the first and second updating signals comprises a request to access to a service and the one or more processing devices enable the provision of a presence related service based upon the mobile device's presence in the first and second special area, respectively, and also depending on the result of the validation of the at least one OTP that is univocally correlated to the updating signal about the presence of the mobile device in the first special area and second special area, respectively.

According to one implementation the service is a request to repair an smart city radio communication defining device that measure the traffic flow in a given area, the radio device partly defines a special area personalized into the user's smartphone, and the service request includes the alarm related information and the radio communication device serial number. In this example an OTP is comprised into the presence updating signal, and said OTP has been calculated using part of the radio communication defining device serial number (i.e. part of the checking data in this example) as input data.

According to some implementations a method associated with the use of a mobile device and at least one radio communication defining device that transmits a distinctive defining signal that at least partly defines a special area by its coverage, the distinctive defining signal including data, the method including; (i) receiving and processing one or more defining signals in the mobile device to determine, based on a previously obtained at least portion of the data, whether the one or more defining signals are one or more distinctive defining signals and to determine whether or not the mobile device is present in the special area; (ii) sending from the mobile device via a mobile telephone network an updating signal to one or more servers of a provider of presence related services about the mobile device's presence in the special area, the sending of the updating signal being uncorrelated to any mobile device phone call establishment, the updating signal being sent at least one of (i) periodically, (ii) at times recent to when the mobile device enters into or exists from the special area, (iii) when the mobile device remains in the special area and (iv) when the mobile device remains outside the special area; and (iii) sending from the mobile device via a mobile telephone network to the one or more servers of the provider of presence related services at least one One-Time-Password (OTP) that is univocally correlated to the updating signal.

According to some implementations, when the updating signal indicates that the mobile device is present in the special area then at least one OTP is calculated based on information that is included in at least one of the distinctive defining signals that define the special area.

According to some implementations the updating signal comprises the result of a previous determination performed by the mobile device about the mobile device's presence in the special area.

According to some implementations the frequency of the updating signal is different from the frequency of the distinctive defining signal.

According to some implementations the mobile device enables or disables one or more functions related to a presence related service upon receiving enabling or disabling instructions from the provider of presence related services.

A non-transitory computer readable medium storing computer readable program code is provided for causing a processor of a mobile device to perform a method associated with the use of at least one radio communication defining device that transmits a distinctive defining signal that at least partly defines a special area by its coverage, the distinctive defining signal including data. According to some implementations the method includes: (i) receiving and processing one or more defining signals in the mobile device to determine, based on a previously obtained at least portion of the data, whether the one or more defining signals are one or more distinctive defining signals and to determine whether or not the mobile device is present in the special area; (ii) sending from the mobile device via a mobile telephone network an updating signal to one or more servers of a provider of presence related services about the mobile device's presence in the special area, the sending of the updating signal being uncorrelated to any mobile device phone call establishment, the updating signal being sent at least one of (i) periodically, (ii) at times recent to when the mobile device enters into or exists from the special area, (iii) when the mobile device remains in the special area and (iv) when the mobile device remains outside the special area; and (iii) sending from the mobile device via a mobile telephone network to the one or more servers of a provider of presence related services at least one One-Time-Password (OTP) that is univocally correlated to the updating signal.

According to some implementations, when the updating signal indicates that the mobile device is present in the special area, the non-transitory computer readable medium storing computer readable program code further causes the processor to calculate at least one OTP based on information that is included in at least one of the distinctive defining signals that define the special area.

According to some implementations a non-transitory computer readable medium storing computer readable program code is provided that further causes the processor to send the updating signal with information related to the result of a previous determination performed by the mobile device about the mobile device's presence in the special area.

According to some implementations a non-transitory computer readable medium storing computer readable program code is provided that further causes the processor to enable or disable one or more functions in the mobile device related to a presence related service upon the mobile device receiving enabling or disabling instructions from the provider of presence related services.

According to some implementations a mobile device is provided that is capable of receiving a distinctive defining signal from a radio communication defining device that at least partly defines a special area by its coverage, the distinctive defining signal including data, the mobile device comprising: (i) an electronic storage medium that stores at least a portion of the data; and (ii) a processor adapted to process one or more defining signals to determine, based on the at least portion of the data, whether the one or more defining signals are one or more distinctive defining signals and to determine whether or not the mobile device is present in the special area, the processor further adapted to send from the mobile device via a mobile telephone network an updating signal to one or more servers of a provider of presence related services about the mobile device's presence in the special area, the sending of the updating signal being uncorrelated to any mobile device phone call establishment, the updating signal being sent at least one of (i) periodically, (ii) at times recent to when the mobile device enters into or exists from the special area, (iii) when the mobile device remains in the special area and (iv) when the mobile device remains outside the special area, the processor also adapted to send from the mobile device via a mobile telephone network to one or more servers of a provider of presence related services at least one One-Time-Password (OTP) that is univocally correlated to the updating signal.

According to some implementations, when the updating signal indicates that the mobile device is present in the special area, the processor is adapted to calculate at least one OTP based on information that is included in at least one of the distinctive defining signals that define the special area.

According to some implementations the processor is adapted to enable or disable one or more functions related to a presence related service upon the mobile device receiving enabling or disabling instructions from the provider of presence related services.

According to some implementations a mobile device receives first and second distinctive defining signals respectively from first and second radio communication defining devices, the first and second distinctive defining signals at least partly define first and second special areas, respectively, by their coverage, each of the first and second distinctive defining signals respectively including first and second data. Accordingly, a method is provided that includes: (i) receiving and processing one or more defining signals in the mobile device to determine, based on a previously obtained at least portion of the first data, whether the one or more defining signals are one or more first distinctive defining signals and to determine whether or not the mobile device is present in the first special area; (ii) receiving and processing one or more defining signals in the mobile device to determine, based on a previously obtained at least portion of the second data, whether the one or more defining signals are one or more second distinctive defining signals and to determine whether or not the mobile device is present in the second special area; (iii) sending from the mobile device via a mobile telephone network, when the mobile device determination refers to the first special area, a first updating signal to one or more servers of a first provider of presence related services about the mobile device's presence in the first special area, the sending of the first updating signal being uncorrelated to any mobile device phone call establishment, the updating signal being sent at least one of periodically, at times recent to when the mobile device enters into or exists from the first special area, when the mobile device remains in the first special area and when the mobile device remains outside the first special area; (iv) sending from the mobile device via a mobile telephone network, when the mobile device determination refers to the second special area, a second updating signal to one or more servers of a second provider of presence related services about the mobile device's presence in the second special area, the sending of the updating signal being uncorrelated to any mobile device phone call establishment, the second updating signal being sent at least one of periodically, at times recent to when the mobile device enters into or exists from the second special area, when the mobile device remains in the second special area and when the mobile device remains outside the second special area; (v) sending, when the first updating signal indicates that the mobile device is present in the first special area, from the mobile device via a mobile telephone network to one or more servers of the first provider of presence related services at least one One-Time-Password (OTP) that is univocally correlated to the first updating signal, where at least one OTP is calculated based on information that is included in at least one of the distinctive defining signals that define the first special area; and (vi) sending, when the second updating signal indicates that the mobile device is present in the second special area, from the mobile device via a mobile telephone network to one or more servers of a second provider of presence related services at least one One-Time-Password (OTP) that is univocally correlated to the second updating signal.

According to some implementations the first updating signal is sent with information related to the result of a previous determination performed by the mobile device about the mobile device's presence in the first special area.

According to some implementations the second updating signal is sent with information related to the result of a previous determination performed by the mobile device about the mobile device's presence in the second special area.

According to some implementations there is a non-transitory computer readable medium storing computer readable program code for causing a processor of a mobile device to perform a method associated with the mobile device receiving first and second distinctive defining signals that at least partly define a first and second special areas, respectively, by their coverage, each of the first and second distinctive defining signal respectively including first and second data, the method comprising: (i) receiving and processing one or more defining signals in the mobile device to determine, based on a previously obtained at least portion of the first data, whether the one or more defining signals are one or more first distinctive defining signals and to determine whether or not the mobile device is present in the first special area; (ii) receiving and processing one or more defining signals in the mobile device to determine, based on a previously obtained at least portion of the second data, whether the one or more defining signals are one or more second distinctive defining signals and to determine whether or not the mobile device is present in the second special area, (iii) sending from the mobile device via a mobile telephone network, when the mobile device determination refers to the first special area, a first updating signal to one or more servers of a first provider of presence related services about the mobile device's presence in the first special area, the sending of the first updating signal being uncorrelated to any mobile device phone call establishment, the updating signal being sent at least one of periodically, at times recent to when the mobile device enters into or exists from the first special area, when the mobile device remains in the first special area and when the mobile device remains outside the first special area; (iv) sending from the mobile device via a mobile telephone network, when the mobile device determination refers to the second special area, a second updating signal to one or more servers of a second provider of presence related services about the mobile device's presence in the second special area, the sending of the updating signal being uncorrelated to any mobile device phone call establishment, the second updating signal being sent at least one of periodically, at times recent to when the mobile device enters into or exists from the second special area, when the mobile device remains in the second special area and when the mobile device remains outside the second special area; (v) sending, when the first updating signal indicates that the mobile device is present in the first special area, from the mobile device via a mobile telephone network to one or more servers of the first provider of presence related services at least one One-Time-Password (OTP) that is univocally correlated to the first updating signal, where at least one OTP is calculated based on information that is included in at least one of the distinctive defining signals that define the first special area; and (vi) sending, when the second updating signal indicates that the mobile device is present in the second special area, from the mobile device via a mobile telephone network to one or more servers of the second provider of presence related services at least one One-Time-Password (OTP) that is univocally correlated to the second updating signal.

According to some implementations a non-transitory computer readable medium storing computer readable program code further causes the processor to send the first updating signal with information related to the result of a previous determination performed by the mobile device about the mobile device's presence in the first special area.

According to some implementations a non-transitory computer readable medium storing computer readable program code further causes the processor to send the second updating signal with information related to the result of a previous determination performed by the mobile device about the mobile device's presence in the second special area.

DETAILED DESCRIPTION

Figure 1A:
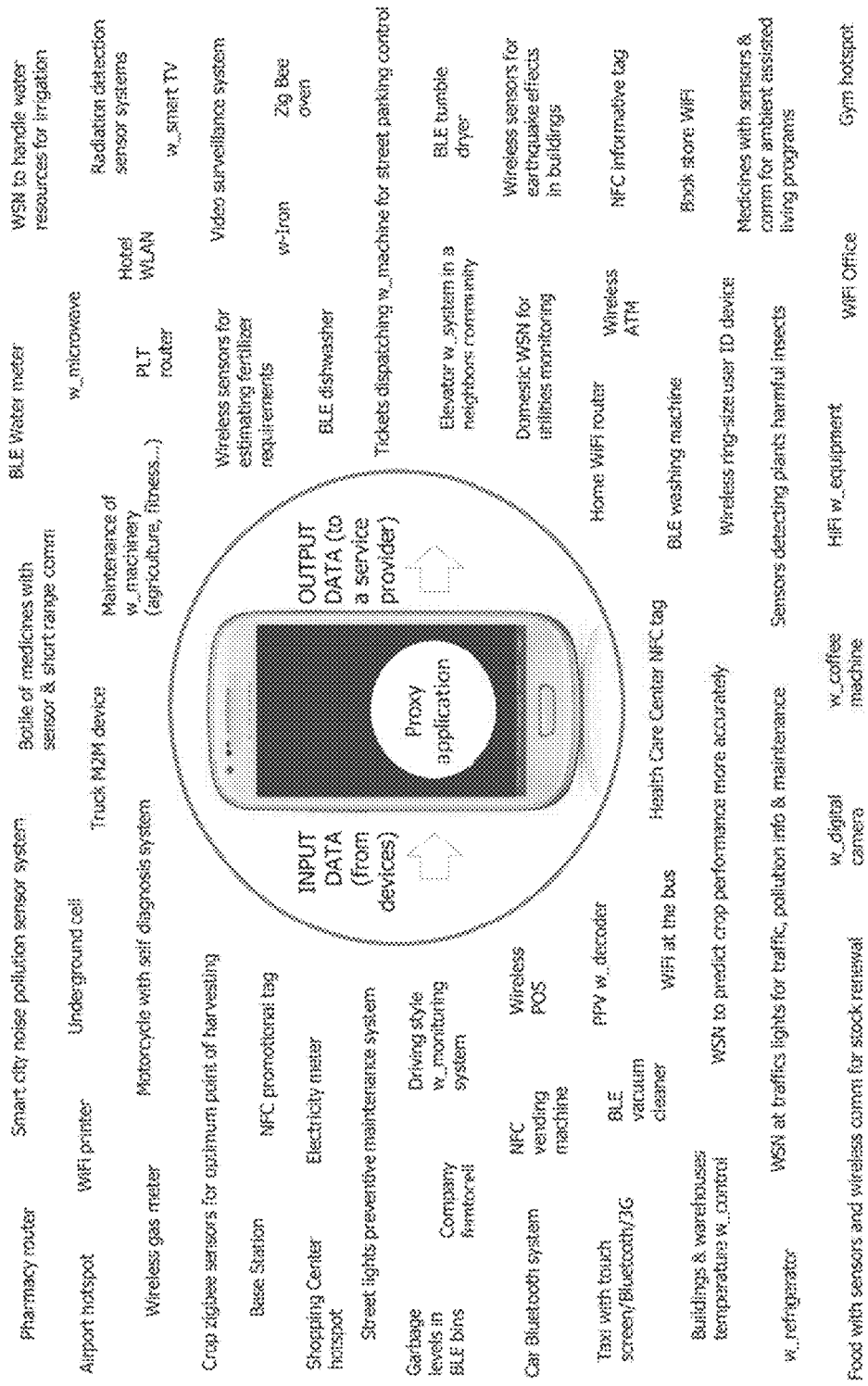
FIG. 1A illustrates a mobile proxy application in the context of an ecosystem of radio communication defining devices.

FIG. 1A illustrates an exemplary ecosystem of devices with wireless communication capabilities. The wireless devices may be home appliances, smart city objects, hot spots, base stations, wireless sensors, NFC tags, contactless Point of Sale devices, contactless ATMs, PCT routers, wireless meters, merchants' short range communication devices, M2M devices, etc., as shown in the figure. Also barcodes and QR codes associated to devices may be wirelessly read via optical means and converted to electrical signals.

The wireless devices are referred to herein as radio communication defining devices and the devices in FIG. 1A are merely illustrative as shall be understood that in an Internet of Things ecosystem any "thing"/"object"/"device" may become enabled with communication capabilities, so may be a radio communication defining device.

Figure 1B:
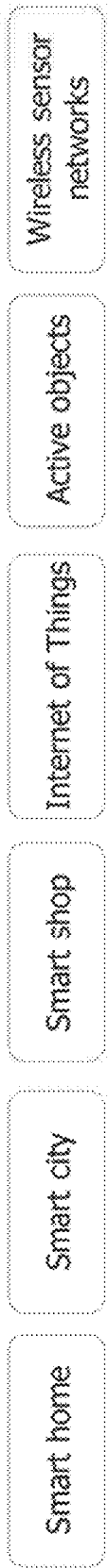
FIG. 1B shows different possible categories for radio communications defining devices.

FIG. 1B shows different possible categories for radio communication defining devices. While some of those devices may be interpreted as belonging to a smart home environment, some others may be associated to categories such as smart cities, smart shops, Internet of Things in general, wireless sensors networks, active objects or other categories. These types of categories are well known and are only referenced in this description for illustration purposes.

In FIG. 1A a smartphone is shown with a proxy application that is able to receive input data from the radio communication defining devices, retransmitting it (or part of it) to a service provider. So in an example the smartphone is able to receive input signals from NFC, ZigBee, WiFi, Bluetooth, BLE, 2G/3G/4G devices or RFID tags, to process them via the proxy application, and to retransmit the information to the service provider. As will be commented later, an application operating as a mere proxy for information coming from radio communication defining devices will produce a set of problems, considering that in the future world there will be trillions of radio communication defining devices.

FIG. 2 illustrates again the same ecosystem of radio communication defining devices (i.e. an ecosystem of devices with wireless communication capabilities via NFC, ZigBee, WiFi, Bluetooth, BLE, 2G/3G/4G, RFID, etc.).

Figure 2:
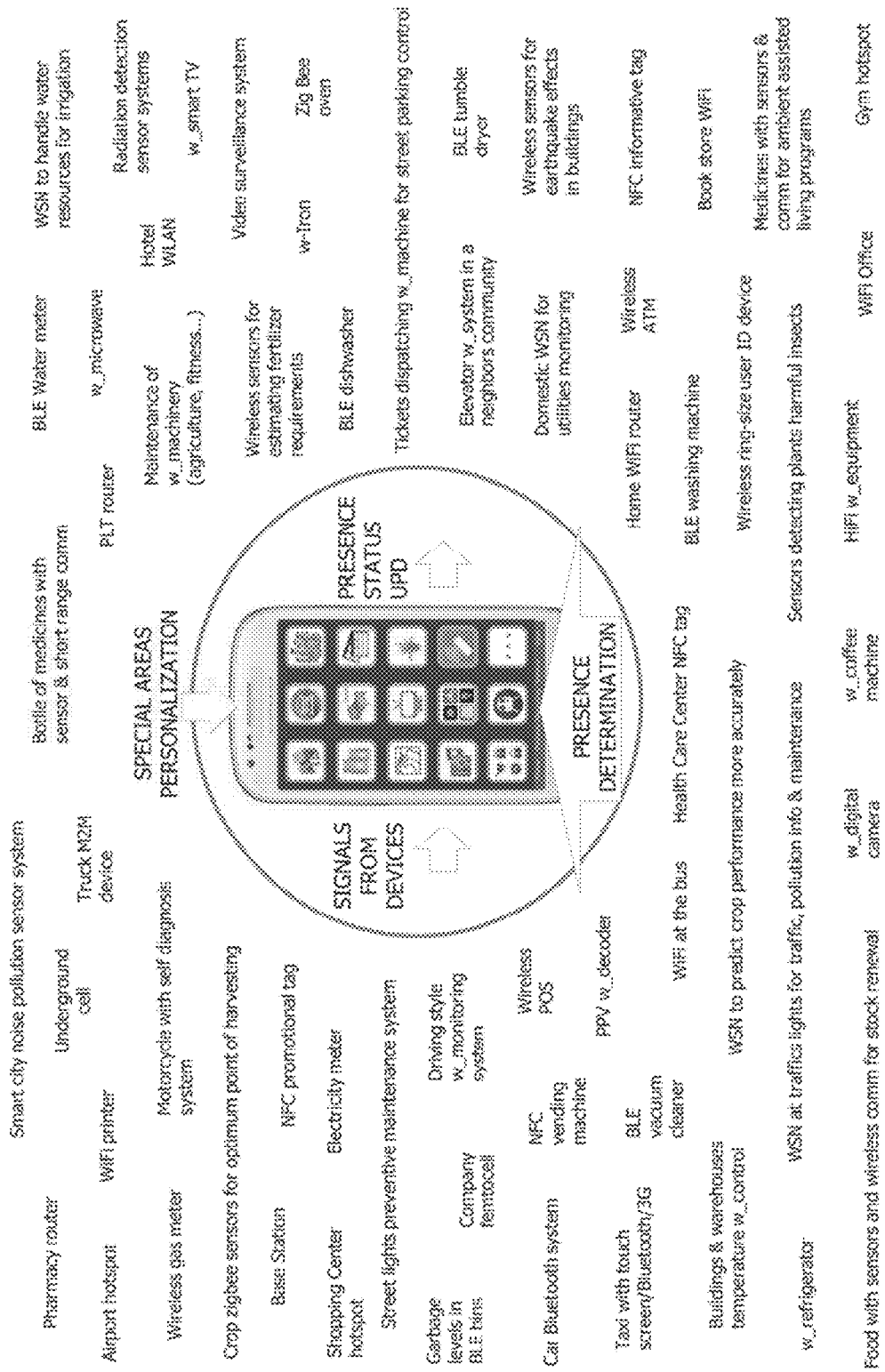
FIG. 2 shows a mobile device capable of enabling presence related services in an ecosystem of radio communication defining devices.

In the context of FIG. 2 it is considered that in the coming world an increasing number of elements of our surrounding environment will be more and more able to interact with us to participate in our day-to-day life and needs.

It means that our washing machine, our TV, the wideband allocated to us, our way of working, our second home, our car, our medicines, the music we buy, the marketing we receive, the way we rent a vehicle, our social responsibility channel, etc., will relate to us differently, as far as those existing "objects" are able to go beyond their primary function, thanks to an extended set of capabilities addressed to make the objects closer to humans, able to connect with us.

A personalized and contextual value proposition may be associated to any object, such that an "Internet of Things" service is provided when certain conditions are met.

Consistently with that view, according to some implementations the user is allowed to define himself (or a service provider to define for the user) the set of radio communication defining devices he would like to pair with, in order to receive presence-based services associated to any of them.

When the mobile device is within the range of coverage of one or several of those selected radio communication defining devices, a presence related status is mobile-device-centric verified and sent to one or more service providers so that one or more defined presence-related services may be provided.

In particular, FIG. 2 illustrates that some special areas have been personalized in the mobile device. Said personalization permits the mobile device to self-determine whether it is present or not into one or more special areas defined by the coverage or one or more radio communication defining devices.

When signals from the radio communication defining devices are received by the mobile device, it is able to determine whether it is present or not into one or more special areas. To make that determination the mobile device uses information that has been stored in its memory during the referred personalization process, and in particular it uses data referred to herein as "checking data".

The stored checking data are used by the mobile device to determine whether or not a defining signal received from a radio communication defining device is or not a distinctive defining signal, where a received signal being distinctive means that it at least partly defines a special area.

The mobile device is prepared to receive defining signals from radio communication defining devices, and has to determine whether a defining signal received is or not a distinctive one. In a particular example the mobile device is ready to receive NFC defining signals from contactless POSs, but only those defining signals from certain POS (e.g. those belonging to merchants associated to the service provider) are distinctive (according to the checking data personalization into the mobile device).

Figure 3:
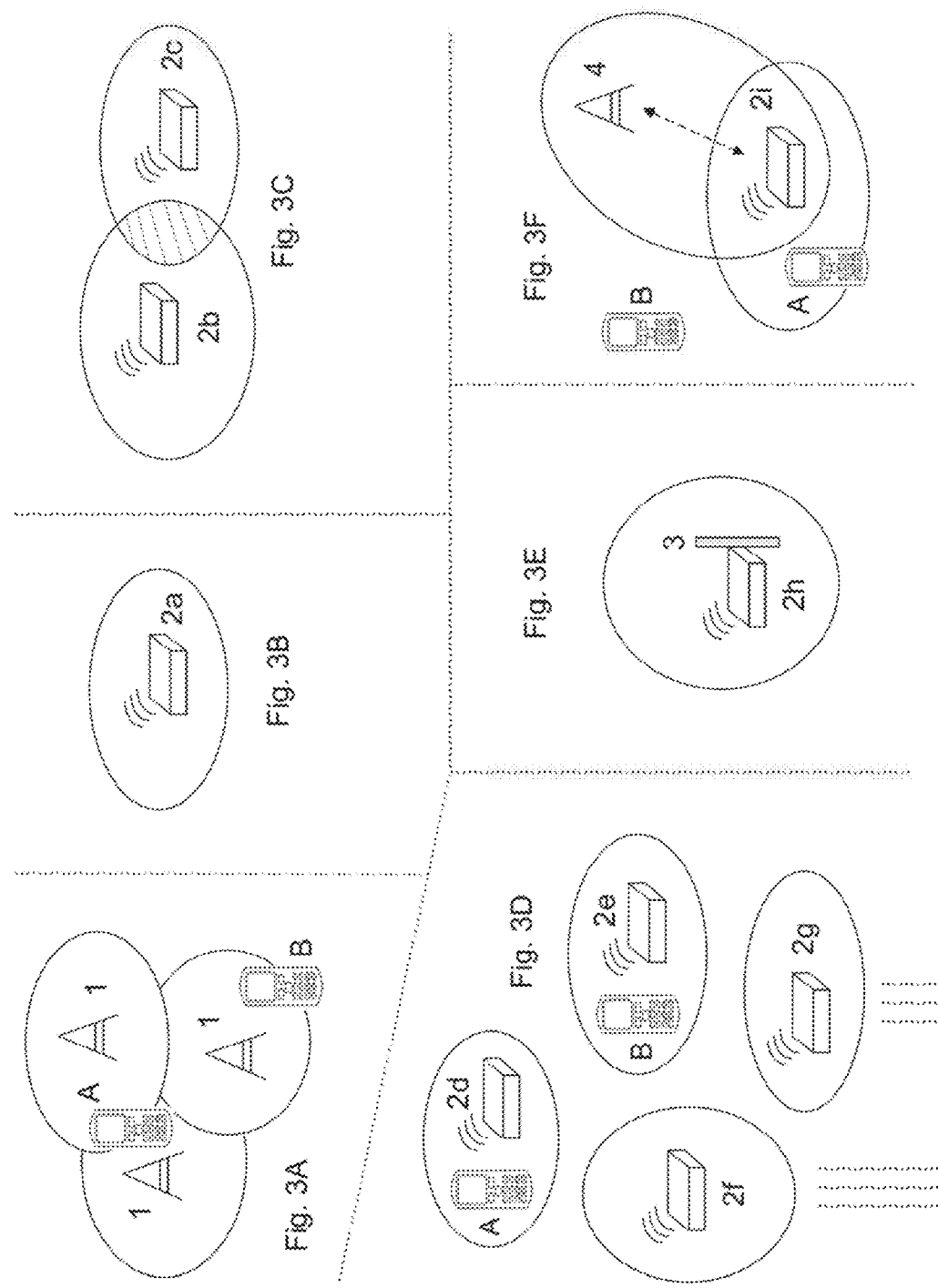
FIGS. 3A-3F illustrate some possibilities to defining special areas associated to presence services provision.

FIG. 3 illustrates coverage areas defined by the combination of the coverage of one or more radio communication defining devices. These coverage areas may be associated to a user's mobile device and to a set of services, and are named as special areas in the context in the invention.

As already commented in connection to FIGS. 1 and 2, the radio communication defining devices may be any type of short range wireless communications devices such as Bluetooth, WIFI, Bluetooth Low Energy, Zig Bee or NFC devices; and also long range wireless communication devices such as Base Stations (BTS) or micro/pico/femto cells from mobile network operators.

The radio communication defining devices may be located in environments like airports, company's premises business centres, homes, train stations, the streets, areas outside a building, lights, bins, etc., and may be embedded in home appliances, vehicles, clothing, food packaging, meters, ATMs, etc.

FIG. 3A shows an example of a special area defined by the sum of the coverage of three radio communication defining devices 1 (the figure illustrates three BTSs as an example). In this example the mobile device determines that it is present into the special area if it receives a distinctive defining signal from at least one of the three radio communication defining devices (the mobile device uses the appropriate checking data to perform said determination).

In particular, FIG. 3A illustrates a scenario where a mobile device A determines that it is present into the special area because it is receiving distinctive defining signals from two radio communication defining devices (mobile device A uses the stored checking data to perform said determination). Mobile device B has not been personalized for said special area, so in spite of it being within the range of coverage of one of the radio communication defining devices, none of the received defining signals from said radio communication defining device is considered as being distinctive for mobile device B, and mobile device B is not present into the special area.

FIG. 3B shows an example of a special area defined by the coverage of one radio communication defining device 2a (for example a wireless enabled washing machine or a car with an embedded Bluetooth communications). In this example a mobile device determines that it is present into the special area if it receives a distinctive defining signal from the radio communication defining device (the mobile device uses the appropriate checking data to perform said determination).

FIG. 3C shows an example of a special area defined by the intersection of the coverage of two radio communication defining devices 2b and 2c. In this example the mobile device determines that it is present into the special area if it receives a distinctive defining signal from the two radio communication defining devices, each one defining the special area partly (the mobile device uses the appropriate checking data to perform said determination).

FIG. 3D shows an example of a special area defined by the sum of the coverage of N radio communication defining devices 2d-2g (the figure illustrates only four of them). In this example the mobile device determines that it is present into the special area if it receives a distinctive defining signal from at least one of the N radio communication defining devices (the mobile device uses the appropriate checking data to perform said determination).

The N radio communication defining devices may be, for example, all the wireless ATMs of a given bank; or all the BLE devices of a given merchant or set of merchants; or a set of wireless enabled home appliances that belongs to the user of the mobile device.

FIG. 3D also illustrates a scenario where a mobile device A determines that it is present in the special area because it is receiving a distinctive defining signal from one radio communication defining device 2d (mobile device A uses the stored checking data to perform said determination). Mobile device B has not been personalized for said special area, so in spite it is within the range of coverage of one of the radio communication defining devices 2e, none of the received defining signals from said radio communication defining device is considered as being distinctive for mobile device B, and mobile device B is not present into the special area.

FIG. 3E shows an example of a special area defined by the coverage of one radio communication defining device 2h (for example a Pay per View wireless decoder). In this example a mobile device determines that it is present into the special area if it receives a distinctive defining signal from the radio communication defining device (the mobile device uses the appropriate checking data to perform said determination).

FIG. 3F shows an example of a special area defined by the coverage of one radio communication defining device 2i (for example an ADSL WiFi router). In this example a mobile device determines that it is present into the special area if it receives a distinctive defining signal from the radio communication defining device (the mobile device uses the appropriate checking data to perform said determination).

In the examples of FIGS. 3E and 3F the distinctive defining signal may contain radio communication defining device identification data and reliable information confirming that the radio communication defining device is effectively located into a predetermined environment. The service provider advantageously avoids fraud linked to a possible shifting of the (portable) radio communication defining device. The checking data stored into the mobile device and associated to the radio communication defining device includes said radio communication defining device identification data.

FIG. 3F also illustrates a scenario where a mobile device A determines that it is present into the special area because it is receiving a distinctive defining signal from the radio communication defining device (mobile device A uses the stored checking data to perform said determination; and it is required for the received defining signal to be considered as distinctive that the reliable information received will confirm that the radio communication defining device will indicate that it is located into a predetermined environment). Mobile device B is not within the range of coverage of the radio communication defining device, so it is not receiving the related distinctive defining signal, and it is not present into the special area.

So a special area associated to a mobile device can be defined by one or more distinctive defining signals. Therefore the checking data may preferably contain information included in every distinctive defining signal defining completely a special area (each one defines it partially) and the mobile device tries to find any of this information in any defining signal received by use of comparison means. The mobile device may receive defining signals that do not define any special area for it. In the case where the special area is defined by two or more distinctive defining signals, this special area may be the intersection of all or part of them or the global coverage of the defining signals.

The distinctive defining signals may be coded and the mobile device processing means include decoding means to decode the distinctive defining signals received.

A radio distinctive defining signal that at least partly defines a special area may be transmitted by a radio communication defining devices in the frequency range allocated to a mobile telephone network (in the case of certain devices, such as BTS, being part of the mobile telephone network of a given mobile telecom operator) or in a different frequency range (which would be the case for the large majority of radio communication defining devices in an IoT ecosystem, transmitting information via NFC, BLE, Bluetooth, WiFi, ZigBee, etc.).

According to some implementations the radio distinctive defining signal that at least party defines the special area contains radio communication device identification data and the checking data stored into the mobile device and associated to this special area includes this radio communication defining device identification data. This identification data may be a unique identifier of the radio communication defining device (e.g. a serial number for identifying a single manufactured unit; a BTS identification code; a MAC address; a UDID or new identifiers defining for Apple devices, etc.).

Processing means of the mobile device processes the defining signals received from radio communication defining devices and compare their radio communication device identification data with the checking data and determine whether one or more distinctive defining signals are received.

As an example, in FIG. 3D mobile device A receives from a radio communication defining device 2d its identification data and determines, comparing those data with stored checking data, that it receiving a distinctive defining signal and that it is present into the special area.

According to some implementations only part of the radio communication defining device identification data is used for determining whether a received signal is distinctive or not and the checking data associated to the special area includes this at least part of the radio communication defining device identification data (e.g. using the generic part of the data that identify the bins in a city into the distinctive defining signal may be enough for the mobile device to determine it is present in the special area constituted by all the city bins and the mobile device may later send the related bin unique identifier data comprised into the updating signal, to request the city council service provider to empty the bin; e.g. receiving a special mobile telephone network identification code into a distinctive defining signal may be enough for the mobile device to determine it is present into a part of the mobile telephone network where the user has the right for special mobile telecommunication tariffs).

In connection to FIG. 3E, the predetermined environment may be one or more specific geographical locations (for example several fixed points into a restaurant) or a physical environment that can be mobile (for example a car, a plane or a boat). In a particular example the predetermined environment is defined by the provider of presence related services.

According to some implementations the reliable information comprised into the distinctive defining signal confirms that the radio communication defining device is effectively located in a predetermined geographical environment when it is physically connected to any one of a set of fixed network connection points 3 defined for the special area and it is also authenticated into the fixed network through any of the mentioned fixed network connection points. According to some implementations the radio communication defining device 2h also comprises means for communicating with the fixed network via any one of the set of fixed connection points 3. According to some implementations some parameters are stored into the radio communication defining device during its configuration stage and such parameters are used by the radio communication defining device to perform the authentication process into the fixed network. These connection points may be PSTN ('Public Switching Telephony Network') connectors for ADSL network services or electrical sockets for PLC ('Power Line Communication') home network services for example.

According to some implementations the reliable information comprised into the distinctive defining signal confirms that the radio communication defining device is effectively located into a predetermined physical environment when:
  the radio communication defining device 2h is physically connected to a system 3 as illustrated in FIG. 3E registered and authorised by the presence services provider for the purposes of the invention and
  the radio communication defining device is authenticated into the mentioned system.

According to some implementations parameters are stored in the radio communication defining device during its configuration stage and such parameters are used by the radio communication defining device to perform the referred authentication process into the system. In an example the system may be an embedded computer in a car or a boat and the radio communication defining device is authenticated into the system.

So in FIG. 3E the radio communication defining device is configured to be located either in a geographical environment, such as for example the user's home, or into a physical environment, which may be mobile, such as for example the user's car, such environments being typically defined by the presence services provider.

In connection to FIG. 3F, reliable information may be comprised in the distinctive defining signal that confirms that the radio communication defining device is effectively located into a predetermined geographical environment when:
  the radio communication defining device is able to receive a RBU signal from at least one radio broadcasting unit (RBU),
  RBU identification data is comprised into the RBU signal,
  the radio communication defining device receives, through the RBU signal from the RBU, the RBU identification data that are included into a RBU identification database of the radio communication defining device.

The storage of the RBU identification data into the radio communication defining device RBU identification data database may be done at the radio communication defining device configuration stage. In the example of FIG. 3F the RBU is a base station 4 and the RBU identification data is a base station identification code. The radio communication defining device is authenticated into the mobile telephone network comprising the base station and may receive the base station signal when it is located within the range of coverage of the base station.

In connection to FIGS. 3E and 3F, processing means comprised in the mobile device may compare any radio communication defining device identification data received with the checking data stored in its internal mobile device database and determines that a radio defining signal received is a distinctive defining signal when:
  such radio defining signal is coded in a format predefined for a distinctive defining signal and
  the radio communication defining device identification data comprised into the defining signal is equal to at least one of the radio communication device identification data stored into the internal mobile device database for the special area and
  the reliable information comprised into the defining signal confirms that the radio communication device is effectively located into a predetermined environment.

Otherwise the mobile device determines that the defining signal received is not a distinctive defining signal.

The examples above are described for illustration purposes to define special areas associated to mobile devices, but it shall be understood that any possible combination of radio communication defining devices to define special areas is feasible. A special area may be defined by just one radio communication defining device or by many; and defining a special area may be the result of using radio communication defining devices transmitting information via a set of communication technologies (for example a BLE iron and a ADSL WiFi router may be used to define the same special area). The special areas may be defined by the sum and/or the intersection of the coverage of a set of radio communication defining devices (e.g. an special area could be defined by the intersection of the coverage of a BTS and a WiFi router plus the sum of the coverage of all the hot spots from a given service provider in a city).

Many different special areas may be defined for a given mobile device, each one associated to the provision of one or more presence related services.

Figure 4:
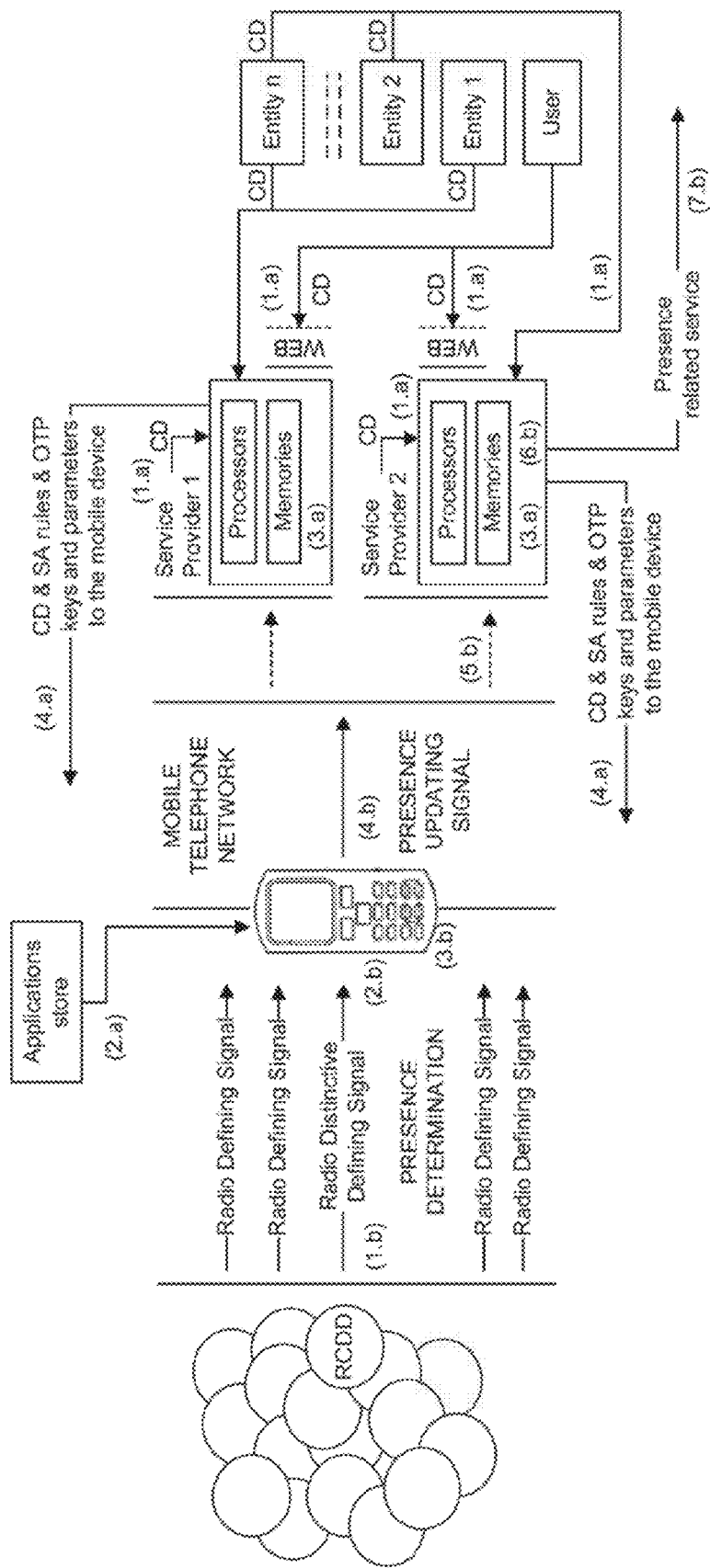
FIG. 4 is a schematic diagram illustrating a system according to some implementations to enable presence related services.

FIG. 4 is a schematic diagram illustrating an exemplary mobile system wherein a mobile telephone network is used to perform certain processes.

A mobile telephone network typically includes a large number of base stations and all the data processing means required to provide the telecommunication service to each mobile device serviced by said mobile network. The mobile telephone network may be cellular or not.

In addition to the more traditional usage of GERAN and UTRAN as radio access networks for the mobile device to access (e.g. via BTSs) to the mobile telephone core network, other radio access networks e.g. as GAN (Generic Access Network) may be used to access the mobile telephone core network through IP-Based access networks, using WLAN. So coming mobile networks will, more and more, use WLAN devices to deliver mobile telecommunication services. Those WLAN devices may also be used as radio communication defining devices.

FIG. 4 shows a system associated with one or more providers of presence related services in connection with the use of a mobile device and a set of radio communication defining devices that transmits radio distinctive defining signals where each distinctive defining signal at least partly defines a special area by its coverage.

According to some implementations at least a first radio communication defining device transmits a first distinctive defining signal and a second radio communication defining device transmits a second distinctive defining signal, the first distinctive defining signal at least partly defines a first special area by its coverage, the second distinctive defining signal at least partly defining a second special area by its coverage.

FIG. 4 illustrates an exemplary preparatory process of adding new checking data into one or more memories of two different service providers, SP1 and SP2, and later sending the checking data to the user mobile device for storage.

In step (1.a) a user inputs checking data related to some owned radio communication defining devices into a web interface of SP1, and the checking data is stored in one or more memories of SP1; and also inputs some other checking data related to other owned radio communication defining devices into a web interface of SP2, and the other checking data is stored into one or more memories of SP2.

Also in step (1.a) several entities (e.g. a car manufacturer, an energy provider or a merchant) associated to a set of radio communication defining devices (e.g. wireless devices embedded into cars, PLC WiFi devices at users home location or iBeacon BLE devices at merchants locations) send checking data related to those devices to SP1. SP1 stores the checking data in one or more memories, and other entities associated to another set of radio communication defining devices send other checking data related to those other devices to SP2, which also stores the other checking data in one or more memories.

Additionally, also in step (1.a), SP1 stores some checking data related to some owned radio communication defining devices into one or more of its owned memories and SP2 also stores some checking data related to some owned radio communication defining devices into one or more of its owned memories.

In step (2.a) the user downloads a mobile device application to enable presence related services from the corresponding applications store to the mobile device. In a particular example the application store may be Google Play for Android devices, iTunes for Apple devices and Blackberry World for Blackberry devices. In other particular example the mobile device application is already available in the mobile device memory when the mobile device is initially delivered to the user.

In step (3.a) some special areas are defined by SP1 and some other special areas are defined by SP2. The definition of each special area relates to checking data associated to the one or more radio communication defining devices that defines it and, when a special area is defined by more than one radio communication defining device, to certain rules that also defines the special area (e.g. a special area may be defined by the sum and/or intersection of the coverage of a set of radio communication defining devices as previously discussed in conjunction with FIG. 3. In the implementation of FIG. 4, when process (3.*a*) ends the checking data related to the referred special areas and the rules that defines the special areas are stored into the one or more memories of SP1 and SP2 respectively.

In step (4.*a*) the stored checking data and associated special area rules are sent from SP1 to the mobile device that stores them in an internal memory of the mobile device; and the stored checking data and associated special area rules are also sent from SP2 to the mobile device, which stores them in an internal memory of the mobile device.

Figure 8:
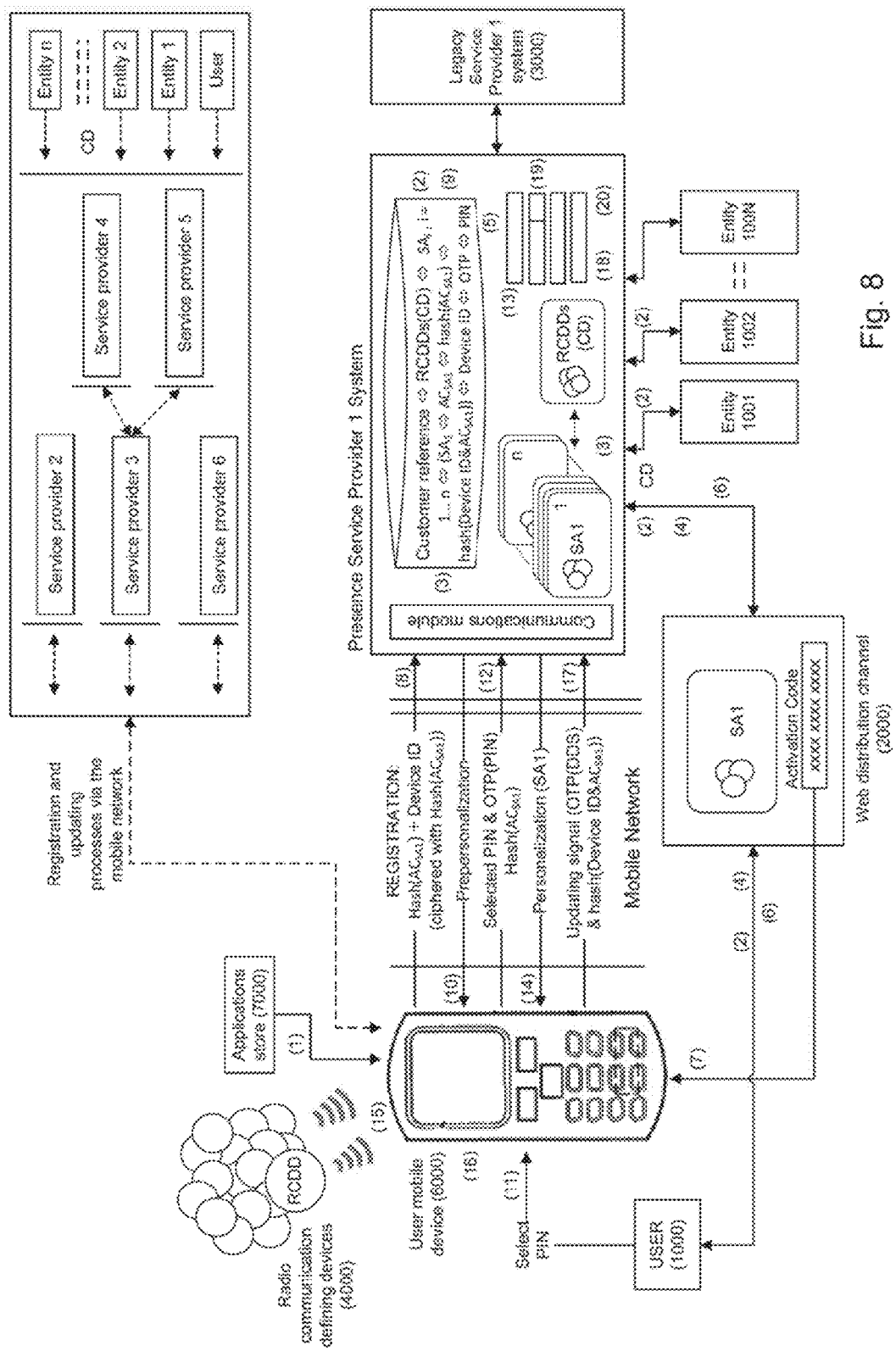
FIG. 8 is a schematic diagram illustrating methods and apparatus according to some implementations to enable presence related services by one or more service providers, where a more detailed description is provided in connection to the presence system of a service provider 1.

According to some implementations the checking data and the associated special area rules related to special areas defined by SP1 are sent to the mobile device in the context of a registration process of the mobile device for those special areas. In the context of this registration process the checking data and the associated special area rules are linked in the one or more memories of SP1 to a first identifier related to the mobile device (e.g. the smartphone IMEI), the identifier being sent from the mobile device to the SP1 in the context of the referred registration process. In this example certain One Time Password (OTP) keys and parameters are sent from SP1 to the mobile device during the referred registration process, to be later used in the context of requesting presence related services from the mobile device to SP1. According to some implementations a PIN may also be selected by the user during the registration process, said PIN being later used to request certain presence related services from the mobile device; the same approach may apply in connection to SP2 and the related special areas. FIG. 8 describes this registration process in more detail.

According to some implementations the checking data, the associated special area rules and the OTP keys and parameters are stored into a memory of the mobile device that relates to a mobile device application, the mobile device application being the one determining the presence status of the mobile device into one or more special areas.

So in relation to the above example of at least a first radio communication defining device and a second radio communication defining device, whose distinctive defining signals at least partly defines a first and a second special area respectively, data capable of linking the mobile device to the first and second special areas is electronically stored in one or more memories, the data including a first checking data of the first radio communication defining device, a second checking data of the second radio communication defining device, and a first identifier related to the mobile device; and there is a transmission via a mobile telephone network to the mobile device of at least a portion of the first checking data, and a transmission via the mobile telephone network to the mobile device of at least a portion of the second checking data.

Once the mobile device has been personalized for special areas presence determination, it is capable to monitor the presence of the mobile device in one or more special areas associated to the mobile device. With reference to FIG. 4, according to some implementations the following steps are involved.

In step (1.*b*) at least one radio communication defining device transmits repeatedly in at least a channel one radio distinctive defining signal that at least partly defines one of the special areas by its coverage.

In step (2.*b*) the mobile device observes the channel and processes any signal received in order to determine whether or not it is receiving any defining signal;

In step (3.*b*) the mobile device processes any defining signal received in order to determine, using the above referred checking data and the associated special area rules, whether or not the defining signal received is a distinctive defining signal that at least partly defines one or more of the special areas, and determines whether or not it is present in one or more of the special areas;

In step (4.*b*) the mobile device sends an updating signal to a mobile telephone network comprising information about its presence in one or more of the special areas, where the updating signal sending is uncorrelated to any mobile device phone call establishment and comprises an identifier related to the mobile device;

In step (5.*b*) the mobile telephone network routes the updating signal to one or more processing devices of SP2 (in this example the updating signal refers to an special area defined by SP2) that adapt in step (6.*b*) the value of at least one operating parameter depending on the presence of the mobile device in each of the special areas, and depending on such a presence status and other possible defined rules and verifications a presence related service may be provided by SP2 in step (7.*b*).

Coming back to the above example of at least a first radio communication defining device and a second radio communication defining device, whose distinctive defining signals at least partly defines a first and a second special area respectively, the service provider (SP1 or SP2 depending on whether one or the other defined the first special area) receives (step 6.*b*) from the mobile device via the mobile telephone network a first updating signal uncorrelated to any mobile device phone call establishment that identifies the mobile device's presence in at least the first special area, and the service provider (SP1 or SP2 depending on whether one or the other defined the second special area) receives from the mobile device via the mobile telephone network a second updating signal uncorrelated to any mobile device phone call establishment that identifies the mobile device's presence in at least the second special area, the first updating signal including a second identifier related to the mobile device, the second updating signal including a third identifier related to the mobile device, This second and third referred identifiers related to the mobile device have the purpose to match each updating signal with a first mobile device identifier that is stored in the one or more memories of the corresponding service provider. According to some implementations the identifiers for a particular mobile device are the same.

In step (6.*b*) the service provider (SP1 or SP2) derives from the first updating signal by one or more processing devices having access to at least a portion of the data whether or not the mobile device is present in the first special area, and deriving from the second updating signal by the one or more processing devices whether or not the mobile device is present in the second special area.

In step 7.*b* the service provider (SP1 or SP2) enables or disables by use of the one or more processing devices a presence related service based upon the mobile device's presence or non-presence in the first special area, and the service provider enables or disables by use of the one or more processing devices a presence related service based upon the mobile device's presence or non-presence in the second special area.

A presence related service may be granted depending on the presence of the mobile device in the special area, but also depending on other additional considerations from the service provider.

In an implementation that uses a secure element at the mobile device, to store e.g. the checking data, the presence determination information may be enough to enable the presence related services as the secure element itself has the capability to securely store sensitive data and to establish a secure channel with the service provider system, via the mobile telephone network.

Nevertheless, if the mobile device application is to be entirely stored in the memory of the mobile device (it is the device memory where games, videos, productivity, music, health, messaging, applications from applications markets, and the like are stored), additional security measures and processes could be desirable to prevent certain type of attacks to gain unauthorized access to presence related services.

According to some implementations when the first updating signal indicates that the mobile device is present in the first special area, enabling the presence related service associated to the mobile device's presence in the first special area also depends on a successful validation by use of the one or more processing devices of the service provider of at least one One-Time-Password (OTP) that is sent from the mobile device and that is univocally correlated to the first updating signal, where at least one OTP is calculated based on information that is included in at least one of the distinctive defining signals that define the first special area, and enabling the presence related service associated to the mobile device's presence in the second special area also depends on successful validation by use of the one or more processing devices of the service provider of at least one One-Time-Password (OTP) that is sent from the mobile device and that is univocally correlated to the second updating signal.

So a method to further and securely authenticate the access to presence related services is provided, the method relaying on calculations that may be performed at the mobile device in the context where the presence into one or more special areas is determined at the mobile device and/or e.g. in the context where the presence updating signal is sent to network special operating means, those calculations to be authenticated by the one or more processing devices of the service provider before providing the related presence services.

Advantageously, access to presence driven services relates to presence of the mobile device into one or more special areas but, on top of that, additional OTP-based authentication is performed by the one or more processing devices.

According to some implementations at least one of the OTP calculations is performed when the mobile device is present in a first special area, based on information from the context. If the context information does not relate to the mobile device being present into the first special area, then the validation of said OTP by the one or more processing devices would not (typically) be successful.

If the information received by the mobile device from the radio communication defining devices makes the mobile device determining that the mobile device is present into the first special area, then at least a portion of the checking data received from the distinctive defining signals that define the first special area will produce a successful OTP validation by the one or more processing devices of the service provider, when used as input data to calculate said OTP.

This approach sets the ground for a fully automatic OTP calculation, associated to the first updating signal, empowered by information related to the context of the mobile device being into the first special area. More than one OTP may be sent univocally associated to the first updating signal, and said other OTPs may be also calculated using data from the context of the mobile device being in the first special area as input data and/or e.g. a user's Personal Identification Number (PIN).

It shall be noted that the method could also be deployed in scenarios where a secure element into the mobile device stores part of the mobile device application sensitive data. However, it is preferred that the mobile device application is entirely stored in the referred mobile device memory, thus avoiding the aforementioned business model barriers and technical complexities for the service providers while simultaneously providing the appropriate security.

Figure 5:
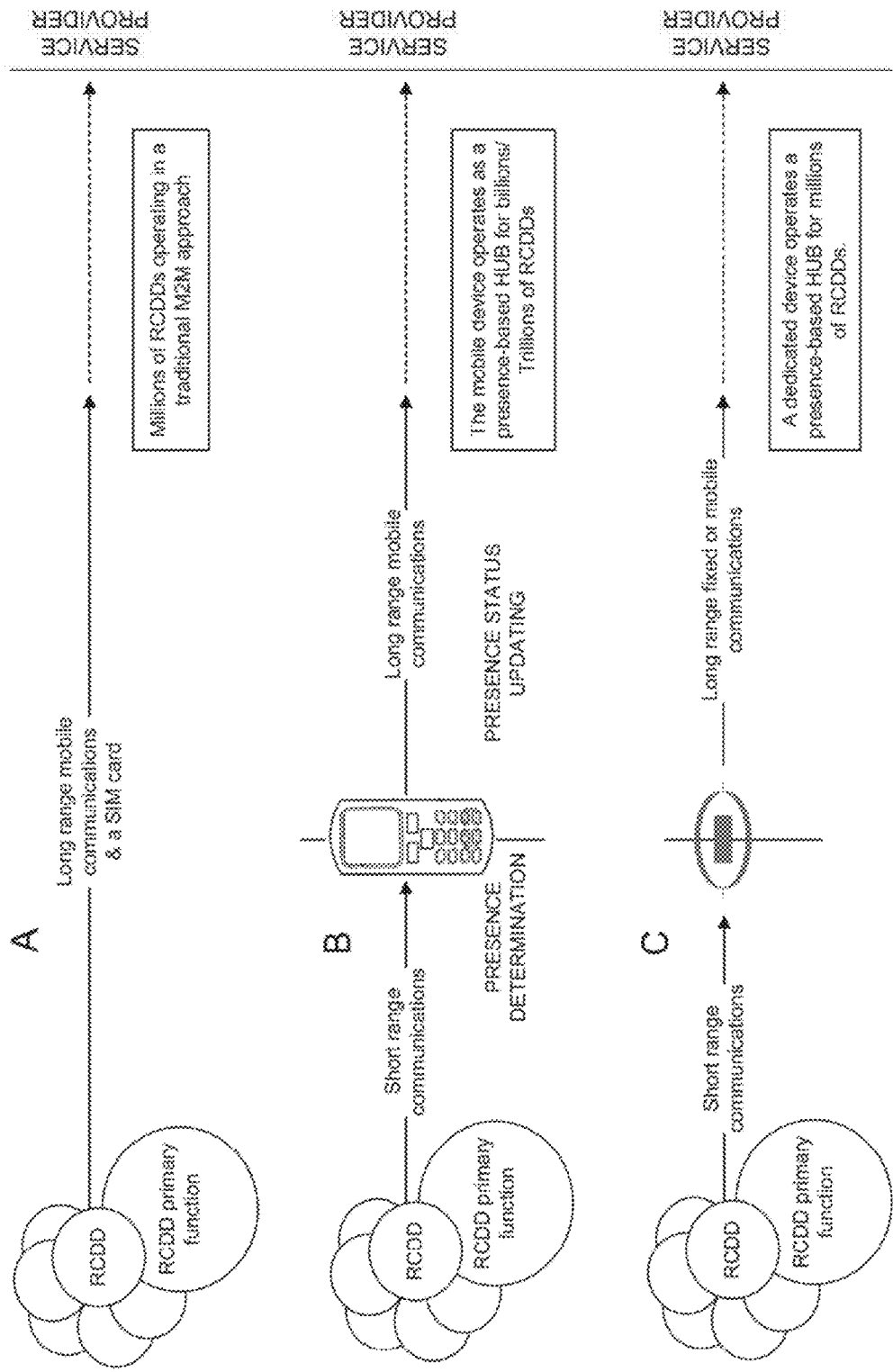
FIG. 5 shows some scenarios to enable services related to radio communication defining devices and it is used to analyse the benefits of utilizing mobile device centric presence determination capabilities.

FIG. 5 shows different scenarios to enable services related to radio communication defining devices.

In the coming future many "objects" from our surrounding environment will interact with us differently, beyond their primary functions. Determining the primary function of each one of the wireless "things" illustrated in FIGS. 1A and 2 (referred to herein as radio communication defining devices—RCDDs) is simple (e.g. the primary function of a WiFi printer is to print documents) but no doubt that each one of them may have a number of new added value services.

When analyzing them in terms of the Internet of Things, it seems evident that endowing an "object" with communications may allow it to connect to the internet to deliver, for example, to a service provider information necessary to enable the referred object-related additional added value services.

Within this view, a "thing" representation into the internet is driven, at least partly, from information provided to the internet by the object itself (or by another element "on behalf" of the object). As an example, a city maintenance service can be managed more efficiently if each tree is equipped with a wireless sensor to be able to self-determine and inform to smart city services about when it requires special care, such that maintenance routes can be organized.

System A in FIG. 5 shows a traditional Machine-To-Machine (M2M) approach where the "things" (RCDDs) are equipped with a SIM card and a data subscription; nevertheless, from a smart sensing perspective, the IoT "objects" should generally be equipped with cheap, consumption efficient, short range communications (as shown in connection to systems B and C in FIG. 5).

U.S. Pat. No. 8,577,392 issued to Apple Inc., refers to a set of devices (such as mobile, iPad, washing machine or a PC) that send one or several signals to a server, such signal sending requiring the user operating over at least one of the devices (e.g. if a user uses his PC=>the first signal sends the new inputted calendar arrangement). The info comprised into the first signal is a "location" info that allows the server to generate a second signal that make server prediction about where the user is going to be in the future (e.g. if the calendar arrangement indicated that the user will arrive tomorrow morning to the office, then the second signal indicates to the office thermostat that the heating shall start at 08 h 00). In the '392 patent the devices all have long range communications, fixed or mobile, so in case of the devices having long range mobile communications it relates to a traditional M2M approach as the one illustrated in FIG. 5 (A) and the rationale included herein below would apply.

The most probable coming scenario is the one where millions of "things" will be equipped with a SIM card and long range communications, while billions/trillions of "objects" (RCDDs) will support efficient short range communications, as shown, for example in system B of FIG. 5. One of the reasons supporting this rationale is that while the M2M approach causes strong dependencies of the service provider towards the mobile network operator, the referred smart sensing approach may be mobile network operator independent and cost/consumption efficient.

If the "objects" are to deliver information to the internet, they need a hub-device able to perform such task, the hub-device supporting proximity interactions with a multiplicity of "objects", and being endowed with long range communications to deliver the "objects" related information to the internet and to the service provider. The referred hub functions could be provided by dedicated devices (as illustrated for example, in system C of FIG. 5), which the user would need to buy "in addition", or be provided by a user mobile device (as shown in system B of FIG. 5).

In a massive deployment scenario of billions of users and billions or trillions of wireless enabled things (RCDDs), the use of traditional hub-devices would be inefficient. A better approach is to use the smartphone or other portable device already in the hands of the user as a default hub.

System B of FIG. 5 shows the user mobile device being used as the referred hub-device in the context of the potentially trillions of radio communication defining devices but furthermore also illustrates that in an efficient ecosystem, hub-related services shall be enabled by using mobile centric presence determination methods.

Figure 6:
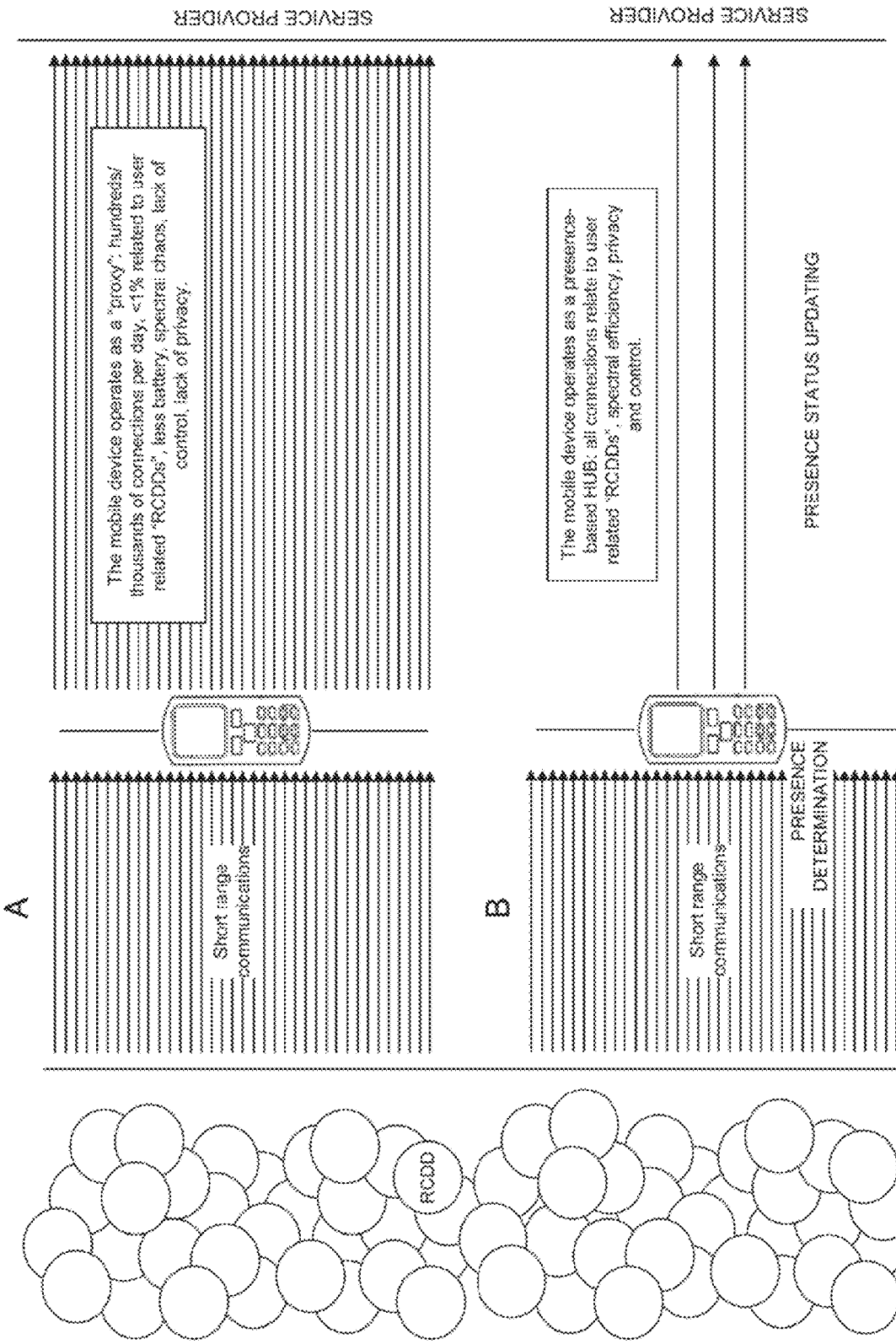
FIG. 6 also shows some scenarios to enable services related to radio communication defining devices and it is used to analyse how presence determination serves to provide spectral efficiency and adequate user control and privacy.

In particular, in system B the mobile device is able to self-determine its presence status around certain personalized special areas, defined each by the coverage of one or more radio communication defining devices, such determination being used to trigger presence related services; if mobile centric presence determination methods would not be used in the referred context, a set of problems would appear, as already commented in connection to FIG. 1A and further elaborated now in connection to FIG. 6.

FIG. 6 also shows different scenarios to enable services related to radio communication defining devices.

System A of FIG. 6 shows a "hub" mobile device able to determine its proximity to radio communication defining devices ("objects") and, only as a result of that proximity, a connection to the internet is established to send objects related information to a service provider. Such approach would derive in systems being spectrally inefficient, chaotic and out of control, and to daily reduce the battery duration on the mobile device.

In a smart city with many wireless objects (RCDDs), they may use hub services from mobile devices (e.g. smartphones, tablets, etc.), the wireless objects being endowed with at least one of BLE, NFC, Bluetooth, WiFi or ZigBee short range communications. In a "reference journey" of just one mobile device, it can move through the range of coverage of hundreds/thousands of those radio communication defining devices . . . every day.

If the mobile device is to make an internet connection simply for being in the proximity of any of the objects, the mobile device would attempt a connection to the internet hundreds if not thousands of times per day, although it is supposed that <1% of those connections would relate to a service associated to a user-related "thing" (RCDD), the rest being "channel garbage".

Furthermore, hub mobile device of system A of FIG. 6 would not be able to offer an appropriate solution in terms of safe guarding user privacy (as it would be transmitting RCDDs-related information without control). In a particular example a smartphone from a user would be sending to the internet information about the washing machine of his neighbor as a result of being in the proximity of that "object" (RCDD). In situations like this smartphone resources would be used without the owner's authorization to transmit information that is property of a third party. No doubt that a system based on such policies would systematically breach privacy rights of potentially billions of users, making it commercially infeasible.

Wireless "things" (RCDDs) related services enabled via mobile devices cannot be massively deployed without adequate personalization and user control. System B of FIG. 6 (B) provides this by using "checking data" and special areas personalization in the mobile device which is used to match user related objects with user special areas; by using the checking data and the associated special areas rules, presence status of the mobile device into user personalized coverage areas is determined. So it is possible to configure the system such that mobile device connections associated to RCDDs will be associated to presence of the mobile device into special areas defined by the coverage of one or more radio communication defining devices, so control, spectral efficiency and privacy are properly guaranteed.

The approach illustrated in system B of FIG. 6 (and also in FIG. 2) from a high level perspective, provides a solution to enable the large majority of the new generation of IoT services based on providing information from the objects (or on behalf of the objects) to the internet and to service providers.

Advantageously, system B of FIG. 6 facilitates:

Usage of just-one technology for the entire ecosystem of "things" (RCDDs) in terms of presence related services, thus avoiding market fragmentation;

Providing the adequate privacy level, ensuring that only the user (or the ones authorized by the user) can access presence-services related to the user's things (RCDDs);

No additional hardware is required (e.g. separate dedicated hub-device), as the user's mobile device itself serves for presence determination;

No extra data subscription is needed for any of the user related things (RCDDs), as the one from the user mobile device serves to enable (or disable) the provision of all presence related services.

As discussed above, client-server-based one-time-use calculations may be used to securely authenticate a presence updating signal. In some implementations the one-time-use calculations depend on input data associated to radio communication devices, but only those radio communication devices associated to special areas personalized into the mobile device application may produce a successful authentication by the service provider processing the signal. So in those scenarios, on top of having the right mobile device and mobile device application personalization, the user must be in the right environment for an updating signal being accepted as authentic by the service provider.

Figure 7:
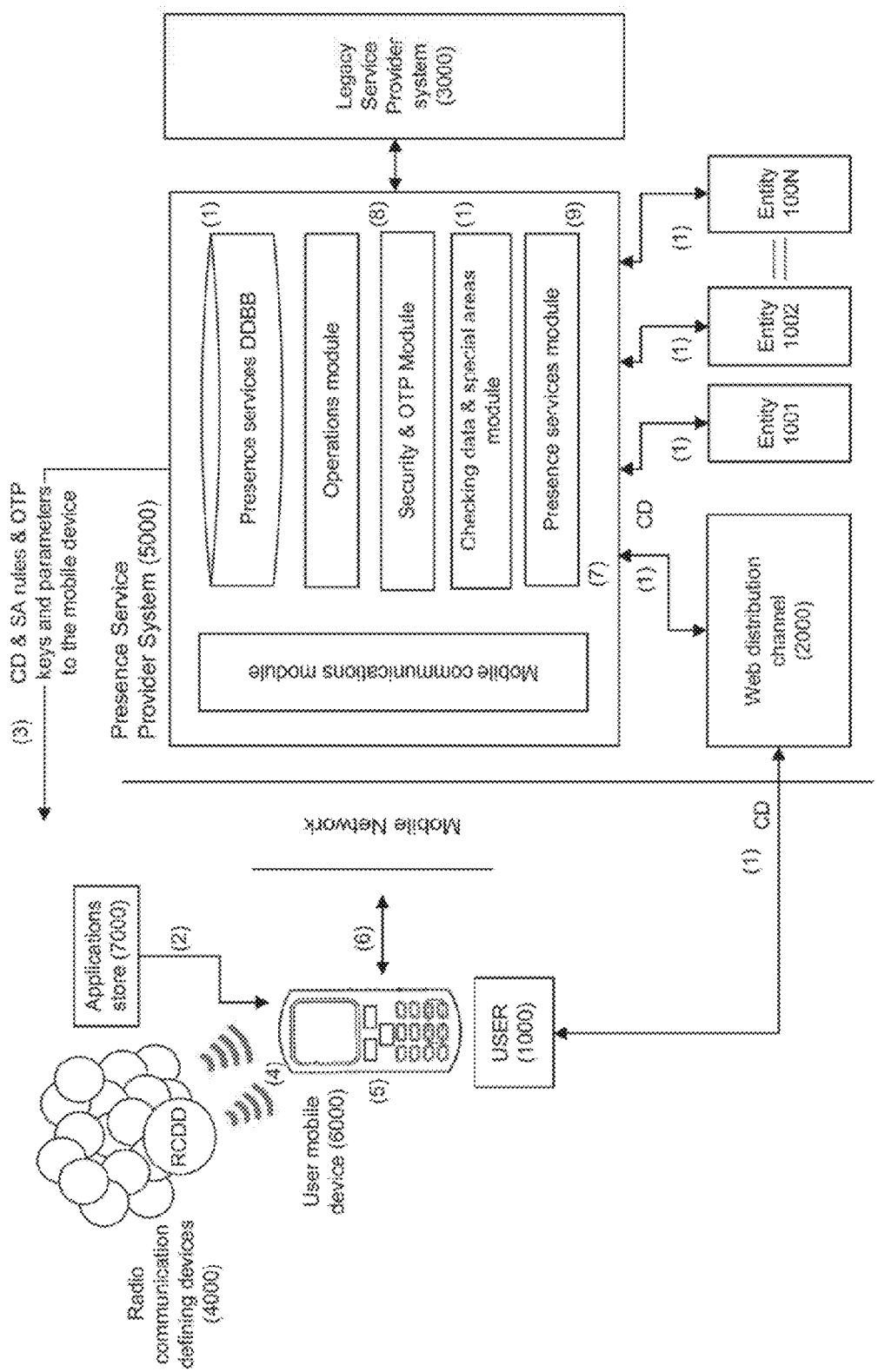
FIG. 7 is a schematic diagram that generally illustrates some functional blocks according to some implementations where mobile centric presence determination and authentication methods are used to securely enable presence related services.

FIG. 7 is a schematic diagram that generally illustrates some functional blocks according to an implementation.

FIG. 7 shows a legacy system 3000 of a service provider and a network presence system 5000 of the service provider. The network presence system elements may be located in one server, or spread in several servers, or computers.

In step (1) a user 1000 inputs data (checking data) related to owned radio communication defining devices into the presence system of the service provider (e.g. via the web distribution channel 2000 of the service provider or via the Mobile Network), and the data is stored in one or more memories in the presence system of the service provider (e.g. in the presence services database shown in FIG. 7). Also in step (1), several entities (1001 . . . 100N), associated to a set of radio communication defining devices send checking data related to those radio devices to the presence system of the service provider, that stores them in one or more memories. In the implementation of FIG. 7 the service provider also stores in step (1) some checking data related to some owned wireless objects in its own one or more memories.

According to some implementations the checking data contains at least part of at least one unique identifier of the corresponding radio communication defining device (e.g. at least part of the serial number of a WiFi router), or at least part of at least one identifier of a radio communication defining device category (e.g. the identifier of the wireless parking meters in an smart city); and part of the radio communication defining devices may be base stations of one or more mobile telephony networks, and other part may be wireless devices with short range communications capabilities such as Bluetooth, DECT, WIFI, Bluetooth Low Energy (BLE), Near Field Communications (NFC), Zig Bee, etc.

Some of the radio communication defining devices are endowed with special area location monitoring means, as those described in connection to FIGS. 3E and 3F, to ensure that they are located in a predetermined environment (e.g. a pay TV wireless decoder is endowed with special area location monitoring means to ensure that presence related pay TV services are not provided if the decoder is moved out of the authorized location).

Special areas may be defined by distinctive defining signals from one or more radio communication defining devices, each one at least party defining at least one special area by its coverage; if a special area relates to several radio communication defining devices it may be defined by the sum and/or the intersection of the coverage of one or more distinctive defining signals from the radio communication defining devices; and also, in some cases, a defining signal being distinctive depends on the radio communication defining device being located in the planned location, as controlled by radio communication defining device special area location monitoring means, and reported by the radio communication defining device to the mobile device.

With continued reference to FIG. 7, the rules are defined at the presence system of the service provider (e.g. in the checking data and special areas module) and the related data for each special area is stored in one or more memories of the service provider (e.g. into the presence services database) and is sent to the mobile device to allow the mobile device to determine, together with the usage of the checking data, whether it is present or not into one or more special areas.

The user downloads in step (2) a presence-related mobile device application from the corresponding applications store (7000) to the mobile device (6000). According to such an implementation, after the user downloads the mobile device application into the mobile device, several of the special areas defined by the service provider are personalized into the mobile device application in the context of the registration process.

Within said registration process the mobile device application sends to the presence system of the service provider a first identifier (e.g. the smartphone IMEI) related to the mobile device, which is then linked to the checking data and the associated special area rules in the one or more memories of the service provider; One Time Password (OTP) keys and parameters are also defined in the presence system of the service provider (e.g. in the security & OTP module shown in FIG. 7), and are also linked to the checking data, the special area rules and the first identifier related to the mobile device.

According to some implementations the user selects a PIN (e.g. by keying the PIN into the mobile device) during the registration process, and the PIN is sent to the presence system and stored in the one or more memories of the service provider. According to some implementations, as for example shown in FIG. 10, the PIN is linked to the checking data, the special area rules, the OTP keys and parameters and the first identifier related to the mobile device.

Finally the checking data, the associated special area rules and the OTP keys and parameters are sent to the mobile device application in step (3), and are stored into a memory of the mobile device that relates to the mobile device application, the mobile device application being the one determining the presence status of the mobile device into the one or more personalized special areas.

So data capable of linking the mobile device to at least one special area is electronically stored in one or more memories of the service provider, the data including checking data of the radio communication defining devices defining the at least one special area, and a first identifier related to the mobile device; and there is a transmission via a mobile telephone network to the mobile device of at least a portion of the checking data.

In step (4) the mobile device receives radio defining signals and/or radio distinctive defining signals from radio communication defining devices (4000) and is able to determine in step (5), using the checking data, the mobile device application and the special areas presence determination rules, whether it is present or not in at least one special area.

In step (6), the mobile device sends a presence updating signal from the mobile device application to the presence system of the service provider, via the mobile telephone network, the updating signal including a second identifier related to the mobile device. The second identifier related to the mobile device has the purpose to match each updating signal with a first mobile device identifier that is stored in the one or more memories of the corresponding service provider. According to some implementations the mobile device identifiers are the same.

In a particular example the updating signal is sent to the presence system of the service provider at least one of: periodically; when the mobile device enters into, remains into, exits out or remains out of at least one special area.

In a particular implementation, the mobile device sends periodically (for example every 30 seconds) an updating signal about its presence into a special area, such updating signal comprising the result of the last determination performed by the mobile device about its presence into the special area.

An updating signal may be sent through a diversity of channels provided by the mobile telephone network (2G/3G/4G data connections, USSD, SMSs, etc.). The data comprised into the updating signal will typically be coded by the mobile device and decoded by the one or more processing devices of the service provider.

The presence system of the service provider receives the updating signal and in step (7) derives from the updating signal by one or more processing devices having access to at least a portion of the data (e.g. data stored in the presence services database) whether or not the mobile device is present in at least one special area. According to the implementation of FIG. 7, the presence updating signal comprises a One-Time-Password (OTP) result.

According to some implementations, if the updating signal indicates that the mobile device is present in at least one special area, then the OTP result is calculated in the mobile device based on information that is included in at least one of the distinctive defining signals that define the at least one special area. In this example, if the updating signal indicates that the mobile device is not present in any special area, then the OTP result is calculated by the mobile device using as input data a predefined value for that scenario, stored (e.g. obfuscated) in the mobile device application database.

In step (8) the OTP is verified by the security & OTP module of the presence service provider system.

In step (9) the presence services module enables or disables the provision of at least one presence related service depending on the presence of the mobile device in one or more special areas; and also depending on successful validation by the security & OTP module of the referred OTP.

So the presence system of the service provider enables or disables by use of the one or more processing devices at least one presence related service based upon the mobile device's presence or non-presence in one or more special areas; wherein according to some implementations, when the updating signal indicates that the mobile device is present in the at least one special area, enabling the at least one presence related service associated to the mobile device's presence in one or more special areas also depends on successful validation by use of the one or more processing devices of at least one One-Time-Password (OTP) that is sent from the mobile device and that is univocally correlated to the updating signal, where at least one of those OTPs is calculated based on information that is included in at least one of the distinctive defining signals that define the at least one special area.

Millions of radio communication defining devices are currently located in a multiplicity of environments such as home location, airports, company's premises, business centres, merchants, banks, transport media; and billions or trillions of radio communication defining devices will exist in the next coming years, related to smart cities, wireless sensor networks or the Internet of Things as a whole. According to some implementations using all of them is allowed in the context of personalized presence services provision, by utilizing mobile-centric presence determination and client-server real time calculations and authentication methods to securely enable the referred presence related services.

FIG. 8 shows another implementation associated with one or more providers of presence related services in connection with the use of a mobile device and at least a radio communication defining device that transmits a distinctive defining signal, the distinctive defining signal at least partly defines one or more special areas by its coverage. The following is described in detail in connection to the presence system of service provider 1. FIG. 8 also shows other service providers of presence related services wherein each of service provider 2 and service provider 6 owns and operates its own presence system; service provider 3 owns and operates its own presence system, but also operates at least part of the presence system of service provider 4 and service provider 5; so the presence system of service provider 4 is partly operated by service provider 3 (on behalf of service provider 4); and the presence system of service provider 5 is also partly operated by service provider 3 (on behalf of service provider 5). Therefore, in this implementation the presence system that is enabling/disabling presence related services associated to a set of users and users' mobile devices is owned and operated by a set of different service providers of presence related services (each one owning/operating a part of it) and the one or more memories and processors of the presence system are spread in several servers, or computers.

As commented above, and in connection to service provider 4 and service provider 5, at least part of the processes lying in the domain of those service providers are performed by a trusted third party, on behalf of the service provider. Advantageously, the service provider can avoid technical complexity by delegating part of the presence related processes to another entity (the service provider 3 in the example of FIG. 8).

FIG. 8 also illustrates, in detail, an exemplary process to securely personalize one or more special areas into a mobile device application installed in a mobile device, to enable presence services provision.

For simplicity, the process to personalize or register one or more special areas in the mobile device application is described in detail in connection to one service provider (service provider 1), However, an equivalent registration and updating process may be used to make the mobile device or mobile device application(s) being personalized with many different presence related special areas defined by a multiplicity of service providers.

In step (1) the user downloads a mobile device application from an applications store into his mobile device, and the application is then installed.

It shall be noted that in an embodiment more than one mobile device application may be downloaded an installed for presence services enablement/disablement, each application being personalized for one or more special areas defined by one or more presence service providers.

In step (2) a user inputs data (checking data) related to owned or associated radio communication defining devices into the presence system of the service provider 1, via the web distribution channel of the service provider, and the data is stored in one or more memories of the presence system of the service provider (this storage is represented as "RCDD(CD)" in FIG. 8).

In some implementations related to the storing checking data, the mobile device application in the mobile device may obtain and store the checking data into the mobile device application database (selecting, for example, a name for the special area such as "smart TV", "plant" or "bottle of medicines") when being in the proximity of one or more radio communication defining devices, sending (e.g. after acceptance by the user or operator via the mobile device keyboard) the data to the presence system of the service provider, via the mobile telephone network, for storage into one or more memories; also, the user (or an operator) may manually input checking data into the mobile device application, to be stored in the mobile device application database and to be sent to the service provider system for storage into one or more memories. To use any of these two last mechanisms to store checking data it is recommended to use a secret code (as the one selected in step (11) herein below in connection to FIG. 8 in the case of the user; or a service provider operator code in the case of the operator). The checking data storage referred to in this paragraph is also represented as "RCDD(CD)" in FIG. 8). In these examples the mobile device application shall receive from the presence system of the service provider a confirmation that the checking data and the definition rules of the given special area have been properly stored and registered into the presence system of the service provider to then make said special area becoming activated into the mobile device application.

Also in step (2), several entities (1001 . . . 100N), associated to a set of radio communication defining devices, send checking data related to those radio devices to the presence system of the service provider 1, that stores the data in one or more memories. In this implementation service provider 1 also stores in step (2) some checking data related to some owned radio communication defining devices into its own one or more memories. Again, the checking data storage referred to in this paragraph is also represented as "RCDD (CD)" in FIG. 8).

According to some implementations the checking data contains at least part of at least one unique identifier of the corresponding radio communication defining device, or at least part of at least one identifier of a radio communication defining device category; and a radio communication defining device may be any wireless device with either long range or short range communications capabilities (Bluetooth, DECT, WIFI, BLE, NFC, Zig Bee, etc.), those devices being part of the Internet of Things ecosystem as a whole. Some of the radio communication defining devices may be endowed with special area location monitoring means as previously described.

In step (3) some presence special areas are defined for the user. In particular, the checking data and special areas module has defined some special areas using at least part of the checking data stored in step (2) and certain rules. The rules may be related to a special area being defined by distinctive defining signals from one or more radio communication defining devices, each one at least partly defining the special area by its coverage; if a special area relates to several radio communication defining devices it may be defined by the sum and/or the intersection of the coverage of one or more distinctive defining signals from the radio communication defining devices; and also, in some cases, a defining signal being distinctive depends on the radio communication defining device being located in the planned location, as controlled by radio communication defining device special area location monitoring means, and reported by the radio communication defining device to the mobile device.

The data related to the definition rules for each special area is stored in one or more memories in the presence system of the service provider. This storage is represented as "SAi, I=1 . . . n" into the database of FIG. 8, representing the storage of "n" defined special areas.

According to some implementations some special areas are defined just after the checking data are stored into the one or more memories of the service provider, after being received from user input, or from the mobile device application, or from the service provider itself, or from entities 1 . . . N. According to some implementations some special areas are defined during the registration process of the mobile device application into one or more special areas (or into the associated presence related services).

According to some implementations the user defines the special areas related to his owned and/or controlled radio communication defining devices via a web interface of the service provider; each entity 1001-100N defines the special areas related to its owned and/or controlled radio communication defining devices via an interface with the presence services provider; and the service provider defines the special areas related to its owned and/or controlled radio communication defining devices. According to some implementations the service provider 3 defines special areas for users, on behalf of service provider 4 and service provider 5.

When some special areas have already being defined for a given user, the relationship between the user (that is a customer of service provider 1), the related radio communication defining devices checking data and the special area rules defined for each special area is stored in the presence services database. The database of service provider 1 may represent the storage and relationships as follows:

[Customer reference ⇔ RCDDs(CD) ⇔ $SA_i$, i=1 . . . n].

According to some implementations the data is stored in a relational database.

Steps (4) to (14) show the registration process of a mobile device application (in a mobile device) into a first special area (SA1) for presence services provision.

In step (4) the user starts the process of registering at least one special area into the mobile device application by sending a request for registration via the web distribution channel of service provider 1. In some cases the request requires a prior payment to be made by the user, e.g. via the web distribution channel of service provider 1, to have access to the presence related services associated to said at least one special area.

According to some implementations an activation code (AC) is generated for registering the mobile device application into each special area. So in step (5), and in connection to registering the mobile device application for the SA1, the $AC_{SA1}$ is generated by the security and OTP module, and it is stored, associated to SA1, into the presence services database of service provider 1. According to some implementations a hash value of the $AC_{SA1}$ is also calculated and stored; this hash value can be later used during this registration process, as detailed herein below. So, at this stage the data relationships into the presence services database of service provider 1 are the following:

[Customer reference ⇔ RCDDs(CD) ⇔ $SA_i$, i=1 . . . n ⇔ ($SA_1$ ⇔ $AC_{SA1}$ ⇔ hash($AC_{SA1}$)].

In step (6) the activation code ($AC_{SA1}$) for registering the mobile device application into $SA_1$ is displayed to the user via the web distribution channel of service provider 1.

In step (7) the user inserts the activation code ($AC_{SA1}$) for $SA_1$ into the mobile device application and in step (8) the mobile device application in the mobile device sends to one or more processors of service provider 1, e.g. via https, the hash($AC_{SA1}$) and the Device ID (ciphered with hash($AC_{SA1}$). The Device ID may be a unique identifier of the mobile device, such as for example the IMEI.

In step (9) one or more processing devices of service provider 1 identifies the customer reference in connection to SA1 by using the received hash($AC_{SA1}$) value. The Device ID ciphered value is then deciphered and stored into the presence services database of service provider 1, as shown in FIG. 8. Also, a new hash(Device ID & $AC_{SA1}$) value is calculated by the one or more processing devices, and stored into the database, associated to the $AC_{SA1}$, and to the hash($AC_{SA1}$) values; this hash(Device ID & $AC_{SA1}$) value can be used later as described herein below. So, at this stage the data relationships into the presence services database of service provider 1 are the following:

[Customer reference ⇔ RCDDs(CD) ⇔ $SA_i$, i=1 . . . n ⇔ ($SA_1$ ⇔ $AC_{SA1}$ ⇔ hash($AC_{SA1}$) ⇔ hash(Device ID& $AC_{SA1}$)) ⇔ Device ID].

OTP keys and parameters are generated/defined in step (9) by the security and OTP module, and are stored into the presence services database of service provider 1. The stored OTP keys and parameters are illustrated in FIG. 8 as "OTP" in the database of service provider 1. So at this stage the data relationships into the presence services database of service provider 1 may be represented as:

[Customer reference ⇔ RCDDs(CD) ⇔ $SA_i$, i=1 . . . n ⇔ ($SA_1$ ⇔ $AC_{SA1}$ ⇔ hash($AC_{SA1}$) ⇔ hash(Device ID& $AC_{SA1}$)) ⇔ Device ID ⇔ OTP].

In step (10) the mobile device application is pre-personalized to enable presence related services for $SA_1$. Pre-personalization refers to a step previous to special areas final personalization and in this phase certain application data and configurations are sent to the mobile device application (e.g. OTP keys and parameters for mobile device OTP related calculations; e.g. certain images, texts, graphics or icons related to presence services associated to SA1).

The OTP keys and parameters may be used to calculate OTP results that uses the PIN as input data, as well as OTP results that do not (e.g. OTP results calculated using information that is included in at least one of the distinctive defining signals that define an special area; examples will be provided herein below).

At the completion of step (10) the mobile device application in the mobile device is pre-registered for presence related services associated to $SA_1$, but receiving checking data and SA1 presence related rules is still pendent.

In a particular example, in case that in step (9) the one or more processing devices determines that the received hash ($AC_{SA1}$) value either does not exists in the database of the presence service provider 1 or the related $AC_{SA1}$ has expired (e.g. because the pre-registration process did not finalize within a designated time period after the $AC_{SA1}$ was generated and stored into the database of presence related services), then the pre-registration process fails and the user may start it again from step (4).

According to some implementations, to make a special area of a provider of presence related services becoming at least partly registered in a mobile device requires the user inserting an activation code into the mobile device and a successful validation of said activation code by one or more processing devices. In this embodiment the $AC_{SA1}$ is validated by validating the related hash($AC_{SA1}$) value.

In step (11) the user is prompted to select a Personal Identification Number (PIN) for presence related services associated to at least $SA_1$ (as commented herein below, in some implementations the same PIN may be used to register into the mobile device more special areas related to service provider 1).

According to some implementations the PIN value is not stored at the mobile device application but is securely sent in step (12), e.g. via https, to the presence system of service provider 1, together with a One-Time-Password (OTP) that has been calculated using the PIN value and OTP keys and parameters stored in the mobile device application database during the previously described pre-registration process; and the hash($AC_{SA1}$) value is also sent, to be able to assign by the one or more processing devices the selected PIN and the OTP result to the right customer reference.

In step (13) the PIN is stored in the one or more memories of service provider 1, in relationship with the previously stored keys and parameters for OTP calculations. This PIN storage into the database of service provider 1 is labelled in FIG. 8 database as "PIN" data.

So, at this stage the data relationships into the presence services database of service provider 1 may be represented as follows:

[Customer reference ⇔ RCDDs(CD) ⇔ $SA_i$, i=1 . . . n ⇔ ($SA_1$ ⇔ $AC_{SA1}$ ⇔ hash($AC_{SA1}$) ⇔ hash(Device ID& $AC_{SA1}$)) ⇔ Device ID ⇔ OTP ⇔ PIN].

In step (13), the one or more processing devices of service provider 1 calculates an OTP result using the stored user PIN and OTP keys and parameters, and compares the result with the one received from the mobile device application. If validation is successful then $SA_1$ can be personalized into the mobile device application database, and $SA_1$ related checking data and rules can be sent to the mobile device application.

So, according to some implementations, the service provider sends special area related checking data and rules to the mobile device application in the mobile device after successful validation of a One Time Password (OTP) received from the mobile device application.

In step (14) $SA_1$ related checking data and rules are sent from the service provider 1 to the mobile device application; the mobile device application in the user mobile device receives the data and stores the data for later determination about whether the mobile device is present or not into $SA_1$. So when step (14) ends $SA_1$ related personalization has been completed.

According to some implementations data capable of linking the mobile device to at least one special area is electronically stored in one or more memories of the service provider of presence related services, the data including checking data of the radio communication defining devices defining the at least one special area, and a first identifier related to the mobile device; and there is transmission via a mobile telephone network to the mobile device of at least a portion of the checking data.

According to some implementations the pre-registration and the registration process into at least one special area (steps (8) to (14) above) shall be made in the context of the same https session, such that the PIN shall be selected in the same session where the activation code is entered. In a particular implementation there is limited time period (e.g. 2 minutes) to select the PIN after the pre-registration process has ended, such that if such a period is exceeded the registration process does not succeed.

In step (15) the mobile device receives radio defining signals and/or radio distinctive defining signals from radio communication defining devices and in step (16) is able to determine, using the checking data, the mobile device application and the presence determination rules, whether it is present or not in at least one special area, for example in $SA_1$.

In step (17), the mobile device sends a presence updating signal (about its presence status in $SA_1$ from the mobile device application to the presence system of service provider 1, via the mobile telephone network.

According to some implementations the presence updating signal is sent to the service provider at least one of: periodically; when the mobile device enters into, remains into, exits out or remains out of at least one special area.

According to some implementations the presence updating signal also comprises a One-Time-Password (OTP) result. In particular, if the updating signal indicates that the mobile device is present in $SA_1$ then the OTP result is calculated based on information that is included in at least one of the distinctive defining signals that define SA1 (as illustrated in connection to step (17) of FIG. 8). According to some implementations, if the updating signal indicates that the mobile device is not present in $SA_1$, then the OTP result is calculated by the mobile device application using as input data a predefined value for that scenario, stored (e.g. obfuscated) into the mobile device application database. According to other implementations if the updating signal indicates that the mobile device is not present in a special area, then an OTP is not calculated by the mobile device.

In step (17) the updating signal also comprises the hash (Device ID & $AC_{SA1}$), to be able to match at the presence system of service provider 1 the updating signal about the presence status of the mobile device into $SA_1$, with the right customer reference and with the rest of the related parameters into the database of service provider 1; and to validate the OTP result using the appropriate keys, parameters and input data.

The presence system of the service provider receives the presence updating signal that identifies the mobile device's presence in $SA_1$ and in step (18) derives from the updating signal by one or more processing devices having access to at least a portion of the data (stored in the presence services database of FIG. 8) whether or not the mobile device is present in $SA_1$.

In step (19) the OTP that was comprised into the presence updating signal is validated by the security & OTP module of the presence service provider 1.

In step (20) the presence services module of the service provider 1 enable or disable by use of one or more processing devices at least one presence related service based upon the mobile device's presence or non-presence into $SA_1$; and also depending on successful validation by the security & OTP module of the service provider 1 of the referred OTP that was comprised into the presence updating signal.

So the presence system of the service provider enables or disables by use of the one or more processing devices at least one presence related service based upon the mobile device's presence or non-presence in one or more special areas; wherein when the updating signal indicates that the mobile device is present in the at least one special area, enabling the at least one presence related service associated to the mobile device's presence in one or more special areas also depends on a successful validation by use of the one or more processing devices of at least one One-Time-Password (OTP) that is sent from the mobile device and that is univocally correlated to the updating signal, where at least one OTP is calculated based on information that is included in at least one of the distinctive defining signals that define the at least one special area.

Figure 9:
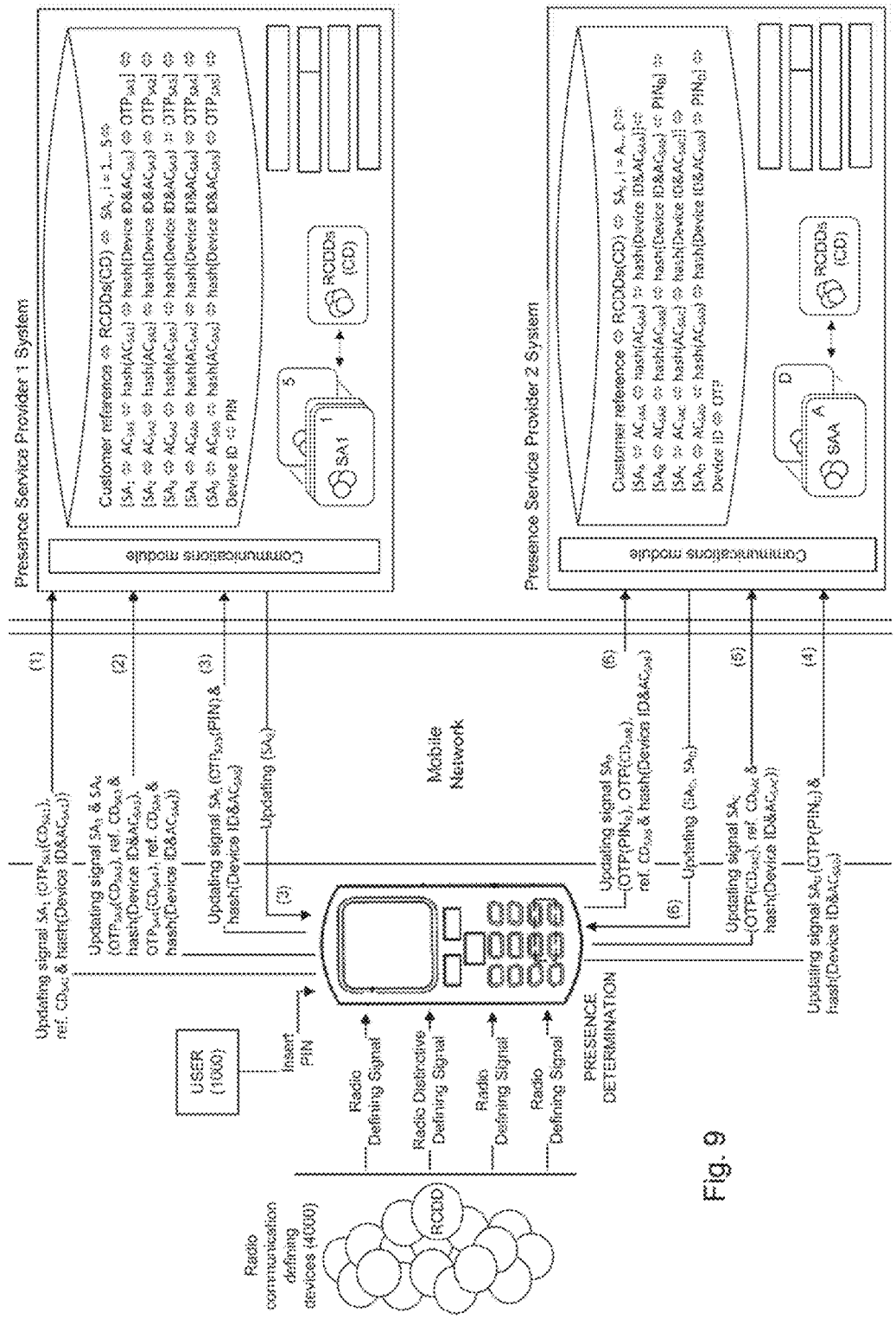
FIG. 9 is a schematic diagram illustrating methods and apparatus according to some implementations to enable presence related services by one or more service providers, where a detailed description is provided in connection to a first provider of presence related services (service provider 1) and to a second provider of presence related services (service provider 2).

FIG. 9 shows another implementation associated with several providers of presence related services in connection with the use of a mobile device and at least a radio communication defining device that transmits a distinctive defining signal, the distinctive defining signal at least partly defines one or more special areas by its coverage. The implementation of FIG. 9 will be described in connection to a first provider of presence related services (service provider 1 in FIG. 9), and a second provider of presence related services (service provider 2 in FIG. 9). It is assumed that the registering of special areas has already occurred and that the mobile device application has been successfully registered for five specials areas defined by service provider 1 ($SA_1$, $SA_2$, $SA_3$, $SA_4$ and $SA_5$) and four special areas defined by service provider 2 ($SA_A$, $SA_B$, $SA_C$ and $SA_D$).

So, at this stage the data relationships into the presence services database of service provider 1 may be represented as follows:

Customer reference $\Leftrightarrow$ RCDDs(CD) $\Leftrightarrow$ $SA_i$, i=1 . . . 5 $\Leftrightarrow$ [$SA_1$ $\Leftrightarrow$ $AC_{SA1}$ $\Leftrightarrow$ hash($AC_{SA1}$) $\Leftrightarrow$ hash(Device ID & $AC_{SA1}$)) $\Leftrightarrow$ $OTP_{SA1}$] $\Leftrightarrow$ [$SA_2$ $\Leftrightarrow$ $AC_{SA2}$ $\Leftrightarrow$ hash($AC_{SA2}$) $\Leftrightarrow$ hash(Device ID & $AC_{SA2}$)) $\Leftrightarrow$ $OTP_{SA2}$] $\Leftrightarrow$ [$SA_3$ $\Leftrightarrow$ $AC_{SA3}$ $\Leftrightarrow$ hash($AC_{SA3}$) $\Leftrightarrow$ hash(Device ID & $AC_{SA3}$)) $\Leftrightarrow$ $OTP_{SA3}$] $\Leftrightarrow$ [$SA_4$ $\Leftrightarrow$ $AC_{SA4}$ $\Leftrightarrow$ hash($AC_{SA4}$) $\Leftrightarrow$ hash(Device ID & $AC_{SA4}$)) $\Leftrightarrow$ $OTP_{SA4}$] $\Leftrightarrow$ [$SA_5$ $\Leftrightarrow$ $AC_{SA5}$ $\Leftrightarrow$ hash($AC_{SA5}$) $\Leftrightarrow$ hash(Device ID & $AC_{SA5}$)) $\Leftrightarrow$ $OTP_{SA5}$] $\Leftrightarrow$ Device ID $\Leftrightarrow$ PIN.

An activation code (AC) has been generated for registering the mobile device application into each special area. The mobile device application has been personalized to enable presence related services for $SA_1$, $SA_2$, $SA_3$, $SA_4$ and $SA_5$. The same PIN has been used to register the five special areas (it was selected when registering the mobile device for the first special area and the same PIN was later also used in step (12) of FIG. 8 to register the other four special areas). According to other implementations different PINs may be used to register the different sets of special areas.

According to some implementations the same PIN is used by the user in connection to the OTP(PIN) calculations associated to any of the five referred special areas. The OTP keys and parameters have been defined per each special area, and are stored in the database of service provider 1 (as show in FIG. 9); and have been sent and are stored in the database associated to the mobile device application. Thus, data capable of linking the mobile device to at least one special area is electronically stored in one or more memories of the service provider 1, the data including checking data of the radio communication defining devices defining the at least one special area, and a first identifier related to the mobile device; and there is transmission via a mobile telephone network to the mobile device of at least a portion of the checking data.

As shown in FIG. 9, the mobile device receives radio defining signals and/or radio distinctive defining signals from radio communication defining devices and is able to determine, using the checking data, the mobile device application and the presence determination rules, whether it is present or not in at least one special area.

A radio defining signal from a radio communication defining device may, for example, be transmitted on a continuous or periodical basis; and the mobile device observation about whether or not it is receiving any defining signal can also be continuous or periodical.

When one or more defining signals are received, they are processed by the mobile device in order to compare the appropriate part of their content with any checking data stored in the internal mobile device database, to determine whether it is receiving one or more distinctive defining signals.

FIG. 9 shows several examples of the mobile device sending a presence updating signal about its presence status into any of the special areas $SA_1$, $SA_2$, $SA_3$, $SA_4$ and $SA_5$, from the mobile device application to the presence system of service provider 1, via the mobile telephone network.

In FIG. 9 the mobile device sends an updating signal about its presence in $SA_1$. In particular, example (1) illustrates the scenario of the updating signal $SA_1$ being sent when the mobile device is present into $SA_1$ (e.g. when enters into $SA_1$) and the OTP result being calculated based on information that is included in at least one of the distinctive defining signals that define $SA_1$. In this example the updating signal also comprises a reference to the checking data that has been used as input data to calculate the OTP result, such that one or more processing devices in the service provider 1 system will be able to make the relative OTP calculation and to proceed with the validation of the OTP received.

According to some implementations, if the updating signal $SA_1$ indicates that the mobile device is not present into $SA_1$, then the OTP result would be calculated by the mobile device application using as input data a predefined value for that scenario, known by the service provider 1 and stored into the server database in connection to the given customer reference and special area, and also stored (e.g. obfuscated) in the mobile device application database (this scenario is not illustrated in FIG. 9). According to other implementations if the updating signal indicates that the mobile device is not present in a special area, then an OTP is not calculated by the mobile device.

As already commented in connection to FIG. 8, the hash (Device ID & $AC_{SA1}$) can be used to match at the presence system of service provider 1 the updating signal about the presence status of the mobile device in $SA_1$, with the right customer reference and with the rest of the related parameters in the database of service provider 1; and to validate the OTP result using the appropriate keys, parameters and input data.

The presence system of service provider 1 receives the presence updating signal that identifies the mobile device's presence in $SA_1$ and derives from the updating signal by one or more processing devices having access to at least a portion of the data (stored in the presence services database of FIG. 9) whether or not the mobile device is present in $SA_1$.

Then, the presence services module of the service provider 1 enables or disables by use of one or more processing devices at least one presence related service based upon the mobile device's presence or non-presence in $SA_1$; and also depending on successful validation by the security & OTP module of the service provider 1 of the referred OTP that was comprised into the presence updating signal.

In the implementation of FIG. 9 the mobile device also sends an updating signal about its simultaneous presence in $SA_3$ and $SA_4$. Example (2) illustrates the scenario of the updating signal $SA_3$ and $SA_4$ being sent when the mobile device is present in both special areas (e.g. when enters into $SA_3$ and remains into $SA_4$) and there is a first OTP result being calculated based on information that is included in at least one of the distinctive defining signals that define SA3 and a second OTP result being calculated based on information that is included in at least one of the distinctive defining signals that define SA4. In this example the updating signal also comprises a reference to the checking data that has been used as input data to calculate the first $OTP_{SA3}$ result and a reference to the checking data that has been used as input data to calculate the second $OTP_{SA4}$ result, such that one or more processing devices in the service provider 1 system will be able to make the relative OTP calculations and to proceed with the validation of the OTPs received.

The presence system of the service provider 1 receives the presence updating signal that identifies the mobile device's presence in $SA_3$ and $SA_4$ and derives from the updating signal by one or more processing devices having access to at least a portion of the data (stored in the presence services database of FIG. 9) whether or not the mobile device is present in $SA_3$ and $SA_4$.

The presence services module of the service provider 1 then enables or disables by use of one or more processing devices at least one presence related service based upon the mobile device's presence or non-presence into $SA_3$, and also depending on successful validation by the security & OTP module of the service provider 1 of the referred $OTP_{SA3}$ that was comprised into the presence updating signal. In this implementation, if the updating signal processing determines that the mobile device was present in $SA_3$ and the validation of the $OTP_{SA3}$ result is positive (i.e. the received OTP is equal to the one calculated at the service provider 1 system) then the at least one presence related service is enabled and can be provided.

In FIG. 9 the mobile device also sends an updating signal about its presence in $SA_5$. Example (3) illustrates the scenario of the updating signal $SA_5$ being sent when the mobile device is present in $SA_5$ (e.g. when remains into $SA_5$) and there is an OTP result being calculated based on the user inputting the PIN in the mobile device application via the mobile device keyboard.

The presence system of the service provider 1 receives the presence updating signal that identifies the mobile device's presence in $SA_5$ and derives from the updating signal by one or more processing devices having access to at least a portion of the data (stored in the presence services database of FIG. 9) whether or not the mobile device is present in $SA_5$.

The presence services module of the service provider 1 then enables or disables by use of one or more processing devices at least one presence related service based upon the mobile device's presence or non-presence in $SA_5$, and also depending on successful validation by the security & OTP module of the service provider 1 of the referred $OTP_{SA5}$ that was comprised into the presence updating signal. In this implementation, if the updating signal processing determines that the mobile device was present in $SA_5$ and the validation of the $OTP_{SA5}$ result is positive (i.e. the received OTP is equal to the one calculated at the service provider 1 system) then the at least one presence related service is enabled (or remains enabled) and can be provided.

During the live cycle of the mobile device software application and the presence related services, the definition of one or more special areas may change: new checking data may be added; some checking data may be modified, or deleted; and the rules defining special areas may change. Those changes would be reflected into the one or more memories of the service provider (in the database of service provider 1 or the one of service provider 2, as applicable in the implementation of FIG. 9).

If the definition of a special area changes in the presence service provider system, then the old special area may become disabled in the database of the service provider, and a new definition is stored in the database. In some cases it might be necessary to obtain a new activation code to make the new special area definition being personalized into the database associated to the mobile device application. In other cases the updating can be made upon the user inserting the PIN in the context of a presence updating signal to the sent.

In the example (3) of FIG. 9, when the updating signal $SA_5$ is received, the one or more processing devices of service provider 1 identify that there is a pending updating of $SA_2$ personalization into the mobile device application, and said updating is then made (upon a successful prior validation of the received OTP(PIN) value) in the context of the https session that is open in connection to the transmission of the updating signal $SA_5$. So in this example, when the referred https connection is closed, the $SA_2$ personalization has been successfully updated into the database of the mobile device that is associated to the mobile device application.

According to some implementations the presence services related to the special areas associated to a given PIN are blocked in the presence system of service provider 1 after a number of wrong consecutive PIN entries (e.g. 3). According to some implementations a wrong PIN entry is accounted when the result of the OTP(PIN) verification, that uses the PIN stored into the database of service provider 1, and OTP keys and parameters, to calculate an OTP result that is compared with the OTP result received from the mobile device application, determines that the entered PIN was not correct.

A different PIN value may be associated to each special area; or to a group of special areas. FIG. 9 shows, in connection to service provider 2, that a $PIN_B$ has been selected when registering the mobile device application to $SA_B$ and a $PIN_D$ has been selected when registering the mobile device application to $SA_D$.

As commented above, in the context of FIG. 9, the processes described in FIG. 8 related to registering special areas for a mobile device application have already occurred, and the mobile device application has become successfully registered for four special areas defined by service provider 2 ($SA_A$, $SA_B$, $SA_C$ and $SA_D$).

So, at this stage the data relationships into the presence services database of service provider 2 may be represented as:

Customer reference ⇔ RCDDs(CD) ⇔ $SA_i$, i=A . . . D ⇔ [$SA_A$ ⇔ $AC_{SAA}$ ⇔ hash($AC_{SAA}$) ⇔ hash(Device ID & $AC_{SAA}$)] ⇔ [$SA_B$ ⇔ $AC_{SAB}$ ⇔ hash($AC_{SAB}$) ⇔ hash(Device ID & $AC_{SAB}$) ⇔ $PIN_B$] ⇔ [$SA_C$ ⇔ $AC_{SAC}$ ⇔ hash($AC_{SAC}$) ⇔ hash(Device ID & $AC_{SAC}$)] ⇔ [$SA_D$ ⇔ $AC_{SAD}$ ⇔ hash($AC_{SAD}$) ⇔ hash(Device ID & $AC_{SAD}$) ⇔ $PIN_D$] ⇔ Device ID ⇔ OTP].

An activation code (AC) has been generated for registering the mobile device application into each special area. The mobile device application has been personalized to enable presence related services for $SA_A$, $SA_B$, $SA_C$ and $SA_D$. $PIN_B$ has been used to register the mobile device application to $SA_B$ and $PIN_D$ has been used to register the mobile device application to $SA_D$.

So in this implementation $PIN_B$ is used by the user in connection to the OTP calculations associated to $SA_B$ that required the PIN as input data for the calculation; and $PIN_D$ is used by the user in connection to those OTP calculations associated to $SA_D$ that required the PIN as input data for the calculation According to some implementations the OTP keys and parameters are common to the four special areas, and are stored into the database of service provider 2 and have been sent and are stored in the database associated to the mobile device application.

Data capable of linking the mobile device to at least one special area is electronically stored in one or more memories of the service provider 2. The data may include checking data of the radio communication defining devices defining the at least one special area, and a first identifier related to the mobile device; and there is transmission via a mobile telephone network to the mobile device of at least a portion of the checking data.

FIG. 9 shows several examples of the mobile device sending a presence updating signal about its presence status in any of the special areas $SA_A$, $SA_B$, $SA_C$ and $SA_D$, from the mobile device application to the presence system of service provider 2, via the mobile telephone network.

In FIG. 9 the mobile device sends an updating signal about its presence in $SA_D$. Example (4) illustrates the scenario of the updating signal $SA_D$ being sent when the mobile device is present in $SA_D$ (e.g. when enters into $SA_D$) and there is an OTP result being calculated based on the user inputting the $PIN_D$ in the mobile device application via the mobile device keyboard.

As already commented in several examples, the hash(Device ID & $AC_{SAD}$) may be used to match at the presence system of service provider 2 the updating signal about the presence status of the mobile device in $SA_D$, with the right customer reference and with the rest of the related parameters into the database of service provider 2; and to validate the OTP result using the appropriate keys, parameters and input data.

The presence system of the service provider 2 receives the presence updating signal that identifies the mobile device's presence in $SA_D$ and derives from the updating signal by one or more processing devices having access to at least a portion of the data (stored in the presence services database of FIG. 9) whether or not the mobile device is present in $SA_D$. The presence services module of the service provider 2 then enables or disables by use of one or more processing devices at least one presence related service based upon the mobile device's presence or non-presence in $SA_D$, and also depending on successful validation by the security & OTP module of the service provider 2 of the referred OTP($PIN_D$) that was comprised into the presence updating signal. If the updating signal processing determines that the mobile device was present in to $SA_D$ and the validation of the OTP($PIN_D$) result is positive (i.e. the received OTP is equal to the one calculated at the service provider 2 system) then the at least one presence related service is enabled (or remains enabled) and can be provided.

The mobile device also sends an updating signal about its presence in $SA_C$. In particular, example (5) illustrates the scenario of the updating signal $SA_C$ being sent when the mobile device is present in $SA_C$ (e.g. when remains in $SA_C$) and the OTP result being calculated based on information that is included in at least one of the distinctive defining signals that define $SA_C$. According to some implementations the updating signal also comprises a reference to the checking data that has been used as input data to calculate the OTP result, such that one or more processing devices in the service provider 2 system will be able to make the relative OTP calculation and to proceed with the validation of the OTP received.

According to some implementations, if the updating signal $SA_C$ indicates that the mobile device is not present in $SA_C$, then the OTP is calculated by the mobile device application using as input data a predefined value for that scenario, known by the service provider 2 and stored in the server database in connection to the given customer reference and special area, and also stored (e.g. obfuscated) in the mobile device application database (this scenario is not illustrated in FIG. 9).

The presence system of service provider 2 receives the presence updating signal that identifies the mobile device's presence in $SA_C$ and derives from the updating signal by one or more processing devices having access to at least a portion of the data (stored in the presence services database of FIG. 9) whether or not the mobile device is present in $SA_C$. The presence services module of the service provider 2 then enables or disables by use of one or more processing devices at least one presence related service based upon the mobile device's presence or non-presence in $SA_C$; and also depending on successful validation by the security & OTP module of the service provider 2 of the referred OTP that was comprised into the presence updating signal.

Furthermore, the mobile device sends an updating signal about its presence in $SA_B$. Example (6) illustrates the scenario of the updating signal $SA_B$ being sent when the mobile device is present in special area $SA_B$ (e.g. when enters into $SA_B$) and there is a first OTP result being calculated based on the user inputting the $PIN_B$ in the mobile device application via the mobile device keyboard and a second OTP result being calculated based on information that is included in at least one of the distinctive defining signals that define $SA_B$. In this example the updating signal also comprises a reference to the checking data that has been used as input data to calculate the second OTP($CD_{SAB}$) result, such that one or more processing devices in the service provider 2 system will be able to make the relative second OTP calculations and to also proceed with the validation of the second OTP received.

According to some implementations, if the updating signal $SA_B$ indicates that the mobile device is not present in $SA_B$, then a single OTP result would be calculated by the mobile device application using as input data a predefined value for that scenario, known by the service provider 2 and stored into the server database in connection to the given customer reference and special area, and also stored (e.g. obfuscated) into the mobile device application database (this scenario is not illustrated in FIG. 9).

The presence system of the service provider 2 receives the presence updating signal that identifies the mobile device's presence in $SA_B$ and derives from the updating signal by one or more processing devices having access to at least a portion of the data (stored in the presence services database of FIG. 9) whether or not the mobile device is present in $SA_B$.

The presence services module of the service provider 2 then enables or disables by use of one or more processing devices at least one presence related service based upon the mobile device's presence or non-presence in $SA_B$, and also depending on successful validation by the security & OTP module of the service provider 2 of the referred OTP/OTPs that was/were comprised in the presence updating signal.

During the life cycle of the mobile device software application and the presence related services, the definition of one or more special areas e.g. related to the service provider 2 may change: new checking data may be added; some checking data may be modified, or deleted; the rules defining special areas may change; some special area is disabled. Those changes would be reflected in the one or more memories of the service provider 2.

If the definition of a special area changes in the presence service provider 2 system, then the old special area may become disabled in the database of service provider 2, and the new definition would be stored into the database.

In some cases it might be necessary to obtain a new activation code to make the new special area definition being personalized into the database associated to the mobile device application. In other cases the updating can be made upon the user inserting the PIN in the context of a presence updating signal to the sent.

In the example (6) of FIG. 9, when the updating signal $SA_B$ is received, the one or more processing devices of service provider 2 identify that there is a pending updating of $SA_C$ and $SA_D$ personalization into the mobile device application, and said updating is then made (upon a successful prior validation of the received OTP values) in the context of the https session that is open in connection to the transmission of the updating signal $SA_B$. So in this example, when the referred https connection is closed, the $SA_C$ and $SA_D$ special areas personalization has been successfully updated (e.g. $SA_C$ has been deactivated and $SA_D$ checking data and rules has been modified) into the database of the mobile device that is associated to the mobile device application.

Figure 10:
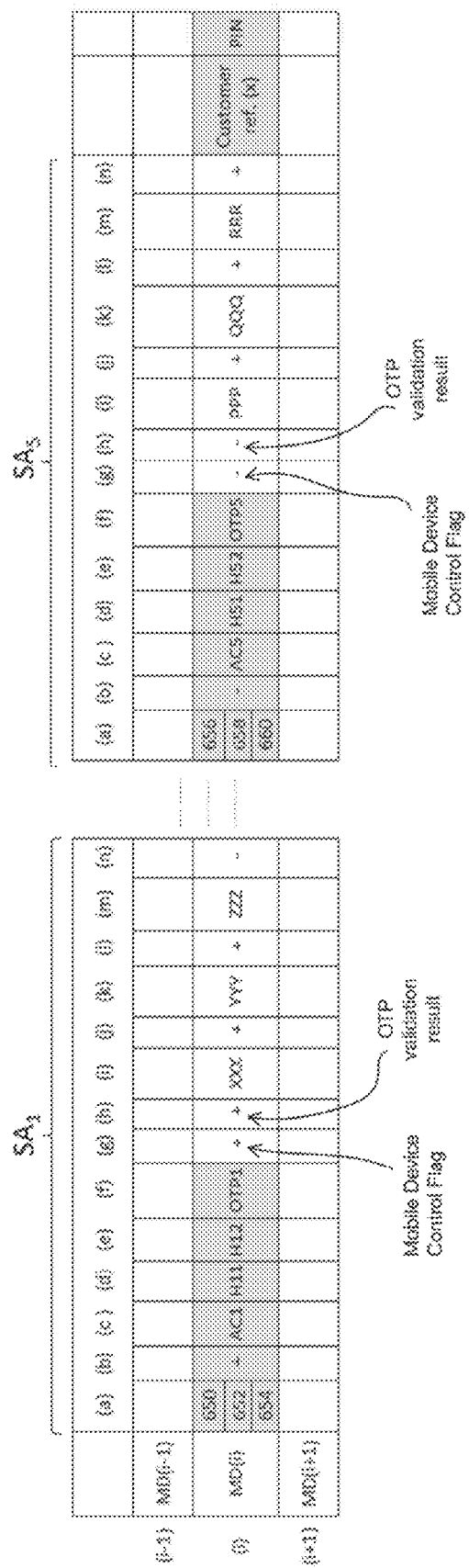
FIG. 10 is a schematic diagram illustrating methods and apparatus according to some implementations where a parameters database of one presence services provider is shown and parameters updating processes are described in the context of presence services provision.

FIG. 10 represents an exemplary presence related database of one service provider. In particular the figure shows a parameters database like the one described in connection to service provider 1 of FIG. 9, where the mobile device application has already become successfully registered for five specials areas defined by service provider 1 ($SA_1$, $SA_2$, $SA_3$, $SA_4$ and $SA_5$).

The illustrated parameters database links the five special areas with three mobile devices identification codes MD(i−1), MD(i) and MD(I+1), each of which have an entry, (i−1), (i) and (i+1). The mobile device application of the three mobile devices has been personalized to enable presence related services for $SA_1$, $SA_2$, $SA_3$, $SA_4$ and $SA_5$ For simplicity, the examples provided herein below only refer to mobile device MD(i).

An activation code (AC) has been generated for registering the mobile device application into each special area and this code is stored in column (c) in connection to each special area for mobile device MD(i). The same PIN has been used to register MD(i) in the five special areas and its storage is illustrated in the last column of FIG. 10, in connection to entry (i). Also the customer reference is illustrated in relationship to entry (i).

The OTP keys and parameters have been defined per each special area, and are stored in column (f) in connection to each special area. The hash values calculated by one or more processing devices of service provider 1 during the pre-registration process of the mobile device application into each special area have been stored in columns (d) and (e) respectively, in connection to each special area associated to mobile device MD(i).

When the presence system of service provider 1 receives an updating signal, one or more processing devices having access to at least a portion of the parameters/data adjust the value of at least one operating parameter of the parameters database linking the special areas and the mobile device. The value of the operating parameter(s) depends on the information contained in the updating signal about the presence of the mobile device into one or more special areas (and sometimes depends also on information that is correlated to the updating signal).

According to some implementations operating parameters related to some presence related services are enabled or remain enabled in the referred parameters database when the information contained in the updating signal indicates that the mobile device has recently entered or remains located in the corresponding special area; and also operating parameters related to some presence related services are enabled or remain enabled in the referred parameters database when there is a successful validation by the security & OTP module of the service provider 1 of the at least one OTP that was comprised into the presence updating signal.

In the same example, operating parameters related to some presence related services are disabled or remain disabled in the referred parameters database when the information contained in the updating signal indicates that the mobile device recently left or remains out of the special area; and also operating parameters related to some presence related services are disabled or remain disabled in the referred parameters database when there is a negative validation by the security & OTP module of the service provider 1 of at least one OTP that was comprised into the presence updating signal.

The first column of the database of FIG. 10 comprises the mobile devices identification codes. A mobile device identification code refers to a unique code of the mobile device such as, for example, the IMEI.

In this example, the definition rules and the set of checking data for mobile device MD(i) in connection to the special area $SA_1$, defined in column (a) of the entry (i) contains:

Special area rules (not illustrated) defining the special area $SA_1$ as the sum of the coverage of three radio communication defining devices;

a checking data 650 comprised in the distinctive defining signal of a first radio communication defining device RCDD1 (e.g. the identification code of RCDD1), such distinctive defining signal defines the special area $SA_1$, checking data 652 comprised in the distinctive defining signal of a second radio communication defining device RCDD2 (e.g. the identification code of RCDD2), such distinctive defining signal also defines the special area $SA_1$, and a checking data 654 comprised in the distinctive defining signal of a third radio communication defining device RCDD3 (e.g. the identification code of RCDD3), such distinctive defining signal also defines the special area $SA_1$, The mobile device determines that it is located in the special area $SA_1$ when it receives at least one of the three identifiers 650, 652, 654 comprised in the distinctive defining signals coming from RCDD1, RCDD2 and RCDD3, that is when it is located within the range of coverage of any of the three distinctive defining signals (according to one implementation, in the case of the defining signal of RCDD2, in order to consider that such defining signal is a distinctive defining signal, it will additionally be necessary that the reliable information comprised into the defining signal confirms that RCDD2 is effectively located in a predetermined environment).

In this example, the value of column (b) for the mobile device MD(i) and for the special area $SA_1$ is enabled ('+') or disabled ('−') at a given time depending on whether or not the service provider receives a confirmation of new checking data from this mobile device confirming that all the checking data corresponding with the special area has been successfully stored into this mobile device (based on the same principle, it would also be possible to add another column in the parameters database to monitor the reception of confirmations of deactivation of checking data and another one to monitor the reception of confirmations of modification of checking data for a given special area).

In this example, the value of column (b) for MD(i) is enabled (+) for the special area $SA_1$. In another example, the value of column (b) for the mobile device MD(i) and for the special area SA1 contains a set of values enabled ('+') or disabled ('−'), one for each checking data.

The column (g) corresponding to the operating parameter "Mobile Device Control Flag" is enabled ('+') or disabled ('−') at a given time for the mobile device MD(i) and for the special area $SA_1$ depending on the information comprised into the updating signals received about the presence of the mobile device into the special area $SA_1$. In this example, at a given time, the mobile device MD(i) is supposed to be in SA1 as the operating parameter "Mobile Device Control Flag" (g) is enabled ('+').

The column (h) corresponds to the result of the validation by the security & OTP module of the service provider 1 of the at least one OTP that was comprised in the presence updating signal. In this example the validation has been positive (meaning that the received at least one OTP has been equal to the at least one calculated by the security and OTP module) and the "OTP validation result" is enabled ('+').

When the "Mobile Device Control Flag" is enabled (+) at a given time for the mobile device MD(i) and for the special area SA1, and the related "OTP validation result" is also enabled ('+'), certain tariffs and/or services related to such special area may be available/provided in connection to the user of the mobile device depending on the value (+) or (−) of the corresponding tariff or service flags for such mobile device and special area into the operating parameters database. In this example, at a given time, in the column 'Tariff identifier' (i), the parameter is then set at 'XXX' and in the column (j), the 'Tariff Flag' is enabled (+). In the column (k), the 'Service identifier' parameter is then set at 'YYY' and in the column (l), the 'Service Flag' of said service 'YYY' is enabled ('+'). In the column (m), the 'Service identifier' parameter is set at 'ZZZ' and in the column (n), the 'Service Flag' of said service 'ZZZ' is disabled ('−') because service ZZZ is disabled at that time for the mobile device MD(i) and the special area SA1.

The set of columns (a), (b) and (g) to (n) provides the same kind of information for the special area $SA_5$. The set of special area rules and checking data of mobile device MS(i) (column a) refers to radio communication defining device RCDD4 with the checking data 656, RCDD5 with the checking data 658 and RCDD6 with the checking data 660 for the special area $SA_5$. In this special area, at that time, the value of column (b) for MS(i) is disabled (−), the operating parameter "Mobile Station Control Flag" (column g) is disabled ('−') and the operating parameter "OTP validation result" (column h) is disabled ('−'). Service 'PPP' (column i) is enabled ('+' in column j), service 'QQQ' (column k) is enabled ('+' in column I) and service 'RRR' (column m) is enabled ('+' in column n). The service PPP and the services QQQ and RRR are associated to mobile station MS(i) when it is in the special area $SA_5$.

In a particular embodiment, the one or more memories and the one or more processing devices reside in one or more servers of one or more providers of presence related services.

Figure 11:
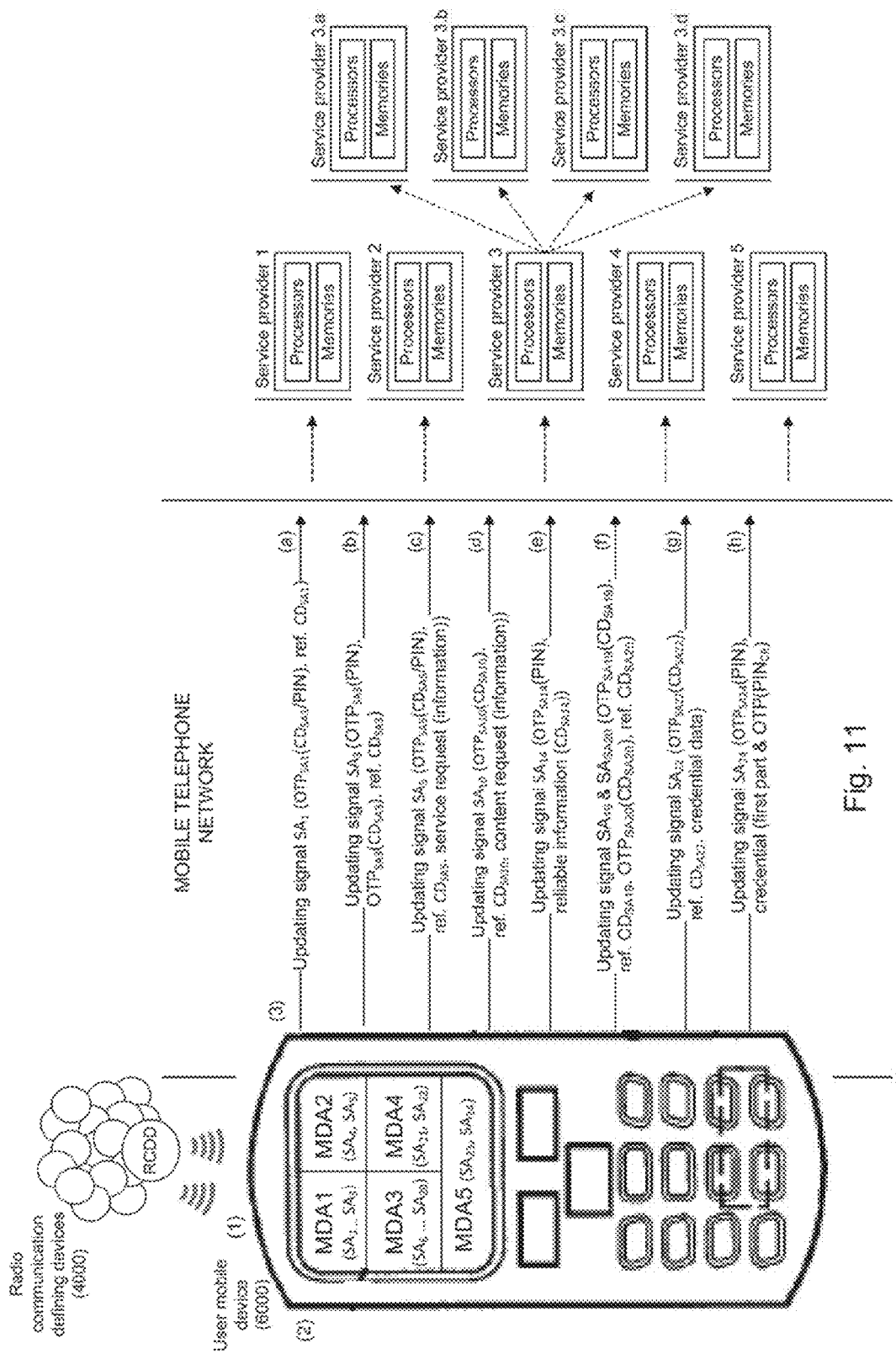
FIG. 11 illustrates a set of mobile device applications related to a set of service providers where presence updating signals are sent from the mobile device to enable presence related services.

FIG. 11 illustrates part of an implementation associated with enabling or disabling by use of the one or more processing devices a presence related service based upon the mobile device's presence or non-presence in at least one special area. This implementation is associated with the use of a mobile device and at least one radio communication defining device that transmits a distinctive defining signal that at least partly defines a special area by its coverage, the distinctive defining signal including data.

FIG. 11 shows in step (1) the process of receiving and processing one or more defining signals from radio communication defining devices in the mobile device to determine in step (2), based on a previously obtained at least portion of the data, whether the one or more defining signals are one or more distinctive defining signals and to determine whether or not the mobile device is present in the at least one special area.

In step (3) the mobile device sends via a mobile telephone network an updating signal to one or more servers of a provider of presence related services about the mobile device's presence in the at least one special area, the updating signal being sent at least one of (i) periodically, (ii) at times recent to when the mobile device enters into or exists from the special area, (iii) when the mobile device remains in the special area and (iv) when the mobile device remains outside the special area.

In some circumstances the mobile device also sends via a mobile telephone network to one or more servers of a provider of presence related services at least one One-Time-Password (OTP) that is univocally correlated to the updating signal.

In a particular example the mobile device sends the at least one OTP when the updating signal indicates that the mobile device is present in at least one special area and at least one OTP is calculated based on information that is included in at least one of the distinctive defining signals that define the at least one special area. According to some implementations at least one OTP is calculated using a user PIN as input data for the calculation.

According to some implementations the at least one OTP is only sent, contextually to the sending of the presence updating signal, when the mobile device is present in at least one special area. In other implementations the at least one OTP is also sent when the mobile device is not present into any special area.

FIG. 11 illustrates a set of mobile device applications (MDA) where:

MDA1 relates to service provider 1 that is a smartphones vendor.

MDA2 relates to service provider 2 that is a provider of smart cities presence services.

MDA3 relates to service provider 3, that is a provider of Internet of Things presence services; this service provider enable presence services for service providers type 3.*a* (car vendors), service providers type 3.*b* (merchants), service providers type 3.*c* (banks), service providers type 3.*d* (transportation entities), etc.

MDA4 relates to a service provider 4, that is a contents provider.

MDA5 relates to a service provider 5, that is a telecom operator.

So in the context of MDA3, and in connection to the service providers type 3.*a*, 3.*b*, 3.*c*, 3.*d*, etc., at least part of the processes in the domain of the service provider are performed by a trusted third party on behalf of the service provider. These service providers may avoid technical complexity by delegating part of the presence related processes to another entity such as service provider 3 as depicted in FIG. 11.

In the context of FIG. 11 it is assumed that the checking data, the related special area rules, the OTP keys and parameters, the PIN, etc., are already stored in one or more memories of the corresponding service provider (as described in connection to, for example FIG. 4, 7, 8, 9 or 10); and it is also assumed that all the MDAs are already personalized to enable presence related services (as described in connection to, for example, FIG. 4, 7, 8, 9 or 10).

FIG. 11 illustrates that $SA_1$, $SA_2$ and $SA_3$ have been personalized in MDA1; $SA_4$ and $SA_5$ have been personalized in MDA2; $SA_6$ to $SA_{20}$ have been personalized in MDA3; $SA_{21}$ and $SA_{22}$ have been personalized in MDA4; and $SA_{23}$ and $SA_{24}$ have been personalized in MDA5.

FIG. 11 also illustrates several examples related to information that may be sent either comprised in the presence updating signal or related to it (for simplicity the hash values have not been illustrated in the following examples. Previous examples have described how the hash values may be comprised into the updating signal.

In a first example (a), MDA1 determines that the mobile device is present in $SA_1$ and sends a presence updating signal to the presence system of the service provider 1. In this example the updating signal $SA_1$ is sent when the mobile device is present in $SA_1$ (e.g. when enters into $SA_1$) and an OTP result comprised in the updating signal is calculated based on the user inputting the PIN via the mobile device keyboard and also based on information that is included in at least one of the distinctive defining signals that define $SA_1$. In this example the updating signal also comprises a reference to the checking data that has been used as input data to calculate the OTP result, such that one or more processing devices in the service provider 1 system will be able to make the relative OTP calculation and to proceed with the validation of the OTP received.

In the example (a) the OTP comprised into the updating signal $SA_1$ is calculated using the checking data of RCDDx and RCDDy, which at least partly defines $SA_1$, and the PIN.

In a second example (b), MDA1 determines that the mobile device is present in $SA_3$ and sends a presence updating signal to the presence system of the service provider 1. The updating signal $SA_3$ comprises a first OTP that is calculated based on information that is included in at least one of the distinctive defining signals that define $SA_3$ (in this example the updating signal also comprises a reference to the checking data that has been used as input data to calculate the OTP result); and a second OTP that is calculated based on the user inputting the PIN via the mobile device keyboard.

In this example the updating signal $SA_3$ is sent with a delay from the instant when the presence of the mobile device into $SA_3$ was determined. This delay may be due to lack of data connectivity when an attempt for sending it was made, or because the mobile device application is programmed to send the updating signal sometime after it was prepared for sending. In this particular example the updating signal $SA_3$ comprises a first $OTP(CD_{SA3})$, associated to the mobile device having been into $SA_3$ (defined by $CD_{SA3}$) at the time of presence determination, and a second OTP(PIN), calculated at the time when the updating signal $SA_3$ is really going to be sent after the user inserts the PIN.

In a third example (c), MDA2 determines that the mobile device is present in $SA_5$ and sends a presence updating signal to the presence system of the service provider 2. The updating signal $SA_5$ comprises an OTP, the reference to the checking data used for the calculation and a request to access to a service (together with the service related information).

In a fourth example (d), MDA3 determines that the mobile device is present in $SA_{10}$ and sends a presence updating signal to the presence system of the service provider 3. The updating signal $SA_{10}$ comprises an OTP, the reference to the checking data used for the calculation and a request to access to a multimedia content.

In a fifth example (e), MDA3 determines that the mobile device is present in $SA_{14}$ and sends a presence updating signal to the presence system of the service provider 3. The updating signal $SA_{14}$ comprises an OTP and the reliable information received from one or more radio communication defining devices (which are endowed with special area location monitoring means of those referred to in connection with FIG. 3) that at least partly define $SA_{14}$. The reliable information is sent together with the associated checking data, such that one or more processing devices of service provider 3 will be able to identify the related RCDDs and its associated data and parameters.

In a sixth example (f), MDA3 determines that the mobile device is present in two special areas, $SA_{19}$ and $SA_{20}$, and sends a presence updating signal to the presence system of the service provider 3. The updating signal $SA_{19}$ and $SA_{20}$ comprises an $OTP_{SA19}$ (and the reference to the checking data used for the calculation) and an $OTP_{SA20}$ (and the reference to the checking data used for the calculation).

In a seventh example (g), MDA4 determines that the mobile device is present in special area $SA_{22}$ and sends a presence updating signal to the presence system of the service provider 4. The updating signal $SA_{22}$ comprises an $OTP_{SA22}$ (and the reference to the checking data used for the calculation) and credential data calculated at the security & OTP module of service provider 4 and sent to the mobile device application as explained in step (14) of FIG. 8. Verification of credential data is necessary to give access to a presence service related to the special area.

According to some implementations credentials data is sent when $SA_{22}$ personalization is made; and one of them is sent comprised in a presence updating signal as an additional presence signal authentication token. Credentials may be renewed in the mobile device application database in the context of updating signals such as those referred to in (3) and (6) of FIG. 9.

According to some implementations the credentials are unstructured data and have been securely obfuscated via a PIN related calculation, before being sent for storage into the mobile device application database. So in this scenario a correct PIN entry into the mobile device would be necessary to send a properly non-obfuscated credential comprised into a presence updating signal.

According to some implementations the credentials are payment credentials and at least one of them must be verified by, for example, a bank (an entity type 3.c in the context of FIG. 11) as a precondition for the presence related service to be provided. So advantageously said presence service is only provided after an associated on-line payment has been made.

According to some implementations, if the presence related service is the on-line payment itself, payment acceptance could depend on being present in the special area and also on the successful validation of the OTP.

According to some implementations, the above referred credential (unstructured data) is used to calculate an OTP (credential) result, that is sent comprised in a presence updating signal, the credential being de-obfuscated (by using the PIN entered by the user) before being used for the OTP calculation.

In example (h) the credentials are first parts of payment credentials, and a second part of one of those is calculated as an OTP value as a result of the user inserting a PIN (that may be different from the PIN related to presence services provision), and the two parts must be verified by, for example, a financial institution (such as, for example, an entity type 3.*c* in the context of FIG. 11) as a precondition for the presence related service to be provided. Advantageously the presence service may also only be provided after an associated on-line payment has been made.

As in the previous case, if the presence related service is the on-line payment itself, payment acceptance could also depend on being present into the special area (and also on the validation of additional OTP results).

So this invention provides a huge number of methods and techniques to enable or disable by use of one or more processing devices presence related services, based upon the mobile device's presence or non-presence into one or more special areas.

Presence related services associated to radio communication defining devices and defined special areas is unlimited, considered the huge potential of the coming Internet of Things ecosystem. Examples may cover a variety of user and service provider's related environments.

Home presence related services may, for example, refer to new facilities a user may have at home to control how the devices operate and interact with the user, based on mobile-centric presence determination. Periodical data measures required by certain home devices (e.g. gas counter) may be automated based on presence determination. Home systems (e.g. video surveillance or pay per view systems) could also be programmed to operate differently depending on whether any family member is or not at home.

Presence services in a merchant environment may be used to provide the user with a contextual and personalized procurement and products/services renewal experience, thus benefiting adopting merchants in terms of increasing sales and customer loyalty. Improved checking processes and contextual tracking information may also be offered to users based on presence determination.

Zone pricing services and mobile bandwidth personalization, according to presence determination criteria, may also be offered to end users. So IT resources and mobile pricing can be adapted to customer preferences and needs in selected environments.

User objects such as electronic appliances, home consumer devices, vehicles, food packaging, etc., are becoming smarter, so they will be able to generate and transmit self-diagnosis information and updating to service providers after presence determination.

The user may also be interested to share certain personal mobile presence information with other users or self-configure via internet a set of personal zones (office, home, gym, car, etc.) for presence determination services.

In other scenarios a user can benefit from ambient assisted living programs for dependent people and/or automatic stock renewal of food or medicines based on presence determination.

Information from urban or rural radio communication devices may also be managed to provide a wide variety of rural or city-zone presence services, in areas such as wireless sensor network or smart cities.

So considering all those possibilities (and many others that are possible using the methods and systems described and contemplated herein) service providers should consider mobile-centric presence determination, based on mobile device applications personalization, and presence services enablement via the mobile device, as an essential piece of their Internet of Thing strategy. Furthermore, using methods and technologies that do not require using a third party owned secure element to enable or disable the referred presence related services gives to service providers the right agility and control of their IoT business.

Although exemplary implementations have been described in detail for the purpose of illustration, it is understood that such detail is solely for that purpose, and variations can be made therein by those skilled in the art without departing from the scope of the invention.

Further, although the implementations disclosed herein with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

What is claimed is:

1. A method associated with the use of a mobile device and at least one radio communication defining device that transmits a distinctive defining signal that at least partly defines a special area by its coverage, the distinctive defining signal including data, the method comprising:

receiving and processing one or more defining signals in the mobile device to determine, based on a previously obtained at least portion of the data, whether the one or more defining signals are one or more distinctive defining signals and to determine whether or not the mobile device is present in the special area, upon determining in the mobile device that one of the defining signals is a distinctive defining signal and that the mobile device is present in the special area, generating in the mobile device one or more One-Time-Passwords with at least one of the one or more One-Time Passwords being calculated based on information in the distinctive defining signal, sending from the mobile device via a mobile telephone network an updating signal to one or more servers of a provider of presence related services about the mobile device's presence in the special area, the sending of the updating signal being uncorrelated to any mobile device phone call establishment, the updating signal being sent at least one of (i) periodically, (ii) at times recent to when the mobile device enters into or exits from the special area, (iii) when the mobile device remains in the special area and (iv) when the mobile device remains outside the special area; and sending from the mobile device via the mobile telephone network to the one or more servers of the provider of presence related services at least one of the one or more One-Time-Passwords.

2. A method according to claim 1, wherein at least one of the one or more One-Time-Passwords is univocally correlated to the updating signal.

3. A method according to claim 1, wherein at least one of the one or more One-Time-Passwords is sent to the one or more servers of the provider of presence related services comprised in the updating signal.

4. A method according to claim 1, further comprising receiving in the mobile device a personal identification number, at least one of the one or more One-Time-Passwords being calculated using the personal identification number.

5. A method according to claim 4, wherein the personal identification number is stored in a memory of the mobile device and subsequently deleted from the memory after the conclusion of at least one of the one or more One-Time-Password calculations.

6. A method according to claim 1, wherein at least one of the one or more One-Time Passwords is calculated using a token and/or hardcoded keys.

7. A method according to claim 1, wherein the updating signal comprises the result of a previous determination performed by the mobile device about the mobile device's presence in the special area.

8. A method according to claim 1, wherein the frequency of the updating signal is different from the frequency of the distinctive defining signal.

9. A method according to claim 1, wherein the mobile device enables or disables one or more functions related to a presence related service upon receiving enabling or disabling instructions from the provider of presence related services.

10. A non-transitory computer readable medium storing computer readable program code for causing a processor of a mobile device to perform a method associated with the use of at least one radio communication defining device that transmits a distinctive defining signal that at least partly defines a special area by its coverage, the distinctive defining signal including data, the method comprising:
   receiving and processing one or more defining signals in the mobile device to determine, based on a previously obtained at least portion of the data, whether the one or more defining signals are one or more distinctive defining signals and to determine whether or not the mobile device is present in the special area,
   upon determining in the mobile device that one of the defining signals is a distinctive defining signal and that the mobile device is present in the special area, generating in the mobile device one or more One-Time-Passwords with at least one of the one or more One-Time Passwords being calculated based on information in the distinctive defining signal,
   sending from the mobile device via a mobile telephone network an updating signal to one or more servers of a provider of presence related services about the mobile device's presence in the special area, the sending of the updating signal being uncorrelated to any mobile device phone call establishment, the updating signal being sent at least one of (i) periodically, (ii) at times recent to when the mobile device enters into or exits from the special area, (iii) when the mobile device remains in the special area and (iv) when the mobile device remains outside the special area; and
   sending from the mobile device via the mobile telephone network to the one or more servers of the provider of presence related services at least one of the one or more One-Time-Passwords.

11. A non-transitory computer readable medium storing computer readable program code according to claim 10 that causes at least one of the one or more One-Time-Passwords to be univocally correlated to the updating signal.

12. A non-transitory computer readable medium storing computer readable program code according to claim 10 that causes at least one of the one or more One-Time-Passwords to be sent to the one or more servers of the provider of presence related services comprised in the updating signal.

13. A non-transitory computer readable medium storing computer readable program code according to claim 10 that further causes at least one of the one or more One-Time-Passwords to be calculated using a personal identification number that is stored in a memory of the mobile device.

14. A non-transitory computer readable medium storing computer readable program code according to claim 10 that further cause at least one of the one or more One-Time-Passwords to be calculated using a token and/or hardcoded keys.

15. A non-transitory computer readable medium storing computer readable program code according to claim 10 that further causes the processor to send the updating signal with information related to the result of a previous determination performed by the mobile device about the mobile device's presence in the special area.

16. A non-transitory computer readable medium storing computer readable program code according to claim 10 that further causes the processor to enable or disable one or more functions in the mobile device related to a presence related service upon the mobile device receiving enabling or disabling instructions from the provider of presence related services.

17. A mobile device capable of receiving a distinctive defining signal from a radio communication defining device that at least partly defines a special area by its coverage, the distinctive defining signal including data, the mobile device comprising:
   an electronic storage medium that stores at least a portion of the data; and a processor adapted to:
   process one or more defining signals to determine, based on the at least portion of the data, whether the one or more defining signals are one or more distinctive defining signals and to determine whether or not the mobile device is present in the special area,
   upon determining in the mobile device that one of the defining signals is a distinctive defining signal and that the mobile device is present in the special area, generate in the mobile device one or more One-Time-Passwords with at least one of the one or more One-Time-Passwords being calculated based on information in the distinctive defining signal,
   to send from the mobile device via a mobile telephone network an updating signal to one or more servers of a provider of presence related services about the mobile device's presence in the special area, the sending of the updating signal being uncorrelated to any mobile device phone call establishment, the updating signal being sent at least one of (i) periodically, (ii) at times recent to when the mobile device enters into or exits from the special area, (iii) when the mobile device remains in the special area and (iv) when the mobile device remains outside the special area; and
   send from the mobile device via the mobile telephone network to the one or more servers of the provider of presence related services at least one of the one or more One-Time-Passwords.

18. A mobile device according to claim 17, wherein the processor is adapted to univocally correlate at least one of the one or more One-Time-Passwords to the updating signal.

19. A mobile device according to claim 17, wherein the processor is adapted to send at least one of the one or more One-Time-Passwords to the one or more servers of the provider of presence related services comprised in the updating signal.

20. A mobile device according to claim 17, wherein a personal identification number is stored in a memory of the mobile device, the processor adapted to use the personal identification number to calculate at least one of the one or more One-Time-Passwords.

21. A mobile device according to claim 17, wherein the processor is adapted to enable or disable one or more functions related to a presence related service upon the mobile device receiving enabling or disabling instructions from the provider of presence related services.

22. A method associated with a mobile device receiving first and second distinctive defining signals respectively from first and second radio communication defining devices, the first and second distinctive defining signals at least partly define first and second special areas, respectively, by their coverage, each of the first and second distinctive defining signals respectively including first and second data, the method comprising:
 receiving and processing one or more defining signals in the mobile device to determine, based on a previously obtained at least portion of the first data, whether the one or more defining signals are one or more first distinctive defining signals and to determine whether or not the mobile device is present in the first special area,
 upon determining in the mobile device that one of the defining signals is a first distinctive defining signal and that the mobile device is present in the first special area, generating in the mobile device one or more first One-Time-Passwords with at least one of the one or more first One-Time-Passwords being calculated based on information in the first distinctive defining signal,
 receiving and processing one or more defining signals in the mobile device to determine, based on a previously obtained at least portion of the second data, whether the one or more defining signals are one or more second distinctive defining signals and to determine whether or not the mobile device is present in the second special area,
 upon determining in the mobile device that one of the defining signals is a second distinctive defining signal and that the mobile device is present in the second special area, generating in the mobile device one or more second One-Time-Passwords,
 sending from the mobile device via a mobile telephone network, when the mobile device determination refers to the first special area, a first updating signal to one or more servers of a provider of presence related services about the mobile device's presence in the first special area, the sending of the first updating signal being uncorrelated to any mobile device phone call establishment, the updating signal being sent at least one of (i) periodically, (ii) at times recent to when the mobile device enters into or exits from the first special area, (iii) when the mobile device remains in the first special area and (iv) when the mobile device remains outside the first special area,
 sending from the mobile device via the mobile telephone network to the one or more servers of the provider of presence related services at least one of the one or more first One-Time-Passwords,
 sending from the mobile device via a mobile telephone network, when the mobile device determination refers to the second special area, a second updating signal to one or more servers of a provider of presence related services about the mobile device's presence in the second special area, the sending of the updating signal being uncorrelated to any mobile device phone call establishment, the second updating signal being sent at least one of (i) periodically, (ii) at times recent to when the mobile device enters into or exits from the second special area, (iii) when the mobile device remains in the second special area and (iv) when the mobile device remains outside the second special area; and
 sending from the mobile device via the mobile telephone network to the one or more servers of the provider of presence related services at least one of the one or more second One-Time-Passwords.

23. A method according to claim 22, wherein at least one of the one or more first One-Time-Passwords is univocally correlated to the first updating signal.

24. A method according to claim 22, wherein at least one of the one or more second One-Time-Passwords is univocally correlated to the second updating signal.

25. A method according to claim 22, wherein at least one of the one or more first One-Time-Passwords is sent to the one or more servers of the provider of presence related services comprised in the first updating signal.

26. A method according to claim 22, wherein at least one of the one or more second One-Time-Passwords is sent to the one or more servers of the provider of presence related services comprised in the second updating signal.

27. A method according to claim 22, further comprising receiving in the mobile device a personal identification number, at least one of the one or more first One-Time-Passwords being calculated using the personal identification number.

28. A method according to claim 22, further comprising receiving in the mobile device a personal identification number, at least one of the one or more second One-Time-Passwords being calculated using the personal identification number.

29. A method according to claim 22, further comprising receiving in the mobile device a personal identification number, at least one of each of the one or more first and second One-Time-Passwords being calculated using the personal identification number.

30. A method according to claim 22, wherein at least one of the one or more first One-Time-Passwords is calculated using a token and/or hardcoded keys.

31. A method according to claim 22, wherein at least one of the one or more second One-Time-Passwords is calculated using a token and/or hardcoded keys.

32. A method according to claim 22, wherein the first updating signal is sent with information related to the result of a previous determination performed by the mobile device about the mobile device's presence in the first special area.

33. A method according to claim 22, wherein the second updating signal is sent with information related to the result of a previous determination performed by the mobile device about the mobile device's presence in the second special area.

34. A non-transitory computer readable medium storing computer readable program code for causing a processor of a mobile device to perform a method associated with the mobile device receiving first and second distinctive defining signals that at least partly define a first and second special areas, respectively, by their coverage, each of the first and second distinctive defining signal respectively including first and second data, the method comprising:
 receiving and processing one or more defining signals in the mobile device to determine, based on a previously obtained at least portion of the first data, whether the one or more defining signals are one or more first distinctive defining signals and to determine whether or not the mobile device is present in the first special area, upon determining in the mobile device that one of the defining signals is a first distinctive defining signal and that the mobile device is present in the first special area, generating in the mobile device one or more first One-Time-Passwords with at least one of the one or more first One-Time-Passwords being calculated based on information in the first distinctive defining signal, receiving and processing one or more defining signals in the mobile device to determine, based on a previously obtained at least portion of the second data, whether the one or more defining signals are one or more second distinctive defining signals and to determine whether or not the mobile device is present in the second special area, upon determining in the mobile device that one of the defining signals is a second distinctive defining signal and that the mobile device is present in the second special area, generating in the mobile device one or more second One-Time-Passwords, sending from the mobile device via a mobile telephone network, when the mobile device determination refers to the first special area, a first updating signal to one or more servers of a provider of presence related services about the mobile device's presence in the first special area, the sending of the first updating signal being uncorrelated to any mobile device phone call establishment, the updating signal being sent at least one of (i) periodically, (ii) at times recent to when the mobile device enters into or exits from the first special area, (iii) when the mobile device remains in the first special area and (iv) when the mobile device remains outside the first special area, sending from the mobile device via the mobile telephone network to the one or more servers of the provider of presence related services at least one of the one or more first One-Time-Passwords, sending from the mobile device via a mobile telephone network, when the mobile device determination refers to the second special area, a second updating signal to one or more servers of a provider of presence related services about the mobile device's presence in the second special area, the sending of the updating signal being uncorrelated to any mobile device phone call establishment, the second updating signal being sent at least one of (i) periodically, (ii) at times recent to when the mobile device enters into or exits from the second special area, (iii) when the mobile device remains in the second special area and (iv) when the mobile device remains outside the second special area; and sending from the mobile device via the mobile telephone network to the one or more servers of the provider of presence related services at least one of the one or more second One-Time-Passwords.

35. A non-transitory computer readable medium storing computer readable program code according to claim 34 that further causes at least one of the one or more first One-Time-Passwords to be univocally correlated to the first updating signal.

36. A non-transitory computer readable medium storing computer readable program code according to claim 34 that further causes at least one of the one or more second One-Time-Passwords to be univocally correlated to the second updating signal.

37. A non-transitory computer readable medium storing computer readable program code according to claim 34 that further causes at least one of the one or more first One-Time-Passwords to be sent to the one or more servers of the provider of presence related services comprised in the first updating signal.

38. A non-transitory computer readable medium storing computer readable program code according to claim 34 that further causes at least one of the one or more second One-Time-Passwords to be sent to the one or more servers of the provider of presence related services comprised in the second updating signal.

39. A non-transitory computer readable medium storing computer readable program code according to claim 34 that further causes at least one of the one or more first One-Time-Passwords to be calculated using a personal identification number stored in a memory of the mobile device.

40. A non-transitory computer readable medium storing computer readable program code according to claim 34 that further causes at least one of the one or more second One-Time-Passwords to be calculated using a personal identification number stored in a memory of the mobile device.

41. A non-transitory computer readable medium storing computer readable program code according to claim 34 that further causes at least one of each of the one or more first and second One-Time-Passwords to be calculated using a personal identification number stored in a memory of the mobile device.

42. A non-transitory computer readable medium storing computer readable program code according to claim 34 that further causes the processor to send the first updating signal with information related to the result of a previous determination performed by the mobile device about the mobile device's presence in the first special area.

43. A non-transitory computer readable medium storing computer readable program code according to claim 34 that further causes the processor to send the second updating signal with information related to the result of a previous determination performed by the mobile device about the mobile device's presence in the second special area.

* * * * *